United States Patent
Ono

(10) Patent No.: US 8,605,198 B2
(45) Date of Patent: Dec. 10, 2013

(54) IMAGING DEVICE

(71) Applicant: FUJIFILM Corporation, Tokyo (JP)

(72) Inventor: Shuji Ono, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 13/851,650

(22) Filed: Mar. 27, 2013

(65) Prior Publication Data

US 2013/0208175 A1    Aug. 15, 2013

Related U.S. Application Data

(63) Continuation of application No. PCT/JP2011/070797, filed on Sep. 13, 2011.

(30) Foreign Application Priority Data

Oct. 1, 2010  (JP) ................................. 2010-224252

(51) Int. Cl.
  *H04N 5/225* (2006.01)
(52) U.S. Cl.
  USPC .......................................... 348/340; 359/666
(58) Field of Classification Search
  USPC .................... 348/340; 359/665, 666
  See application file for complete search history.

(56) References Cited

U.S. PATENT DOCUMENTS

| 6,233,003 | B1 | 5/2001 | Ono |
| 6,449,081 | B1 | 9/2002 | Onuki et al. |
| 2004/0227838 | A1* | 11/2004 | Atarashi et al. ............... 348/340 |
| 2009/0086331 | A1* | 4/2009 | Gunasekaran et al. ....... 359/666 |
| 2011/0122504 | A1* | 5/2011 | Rodr guez Fern ndez et al. ............................ 359/666 |

FOREIGN PATENT DOCUMENTS

| JP | 2000-356751 | 12/2000 |
| JP | 2003-270526 | 9/2003 |
| JP | 2005-164983 | 6/2005 |
| JP | 3753201 | 3/2006 |
| JP | 2006-203011 | 8/2006 |
| JP | 2007-086143 | 4/2007 |
| JP | 2007-193020 | 8/2007 |

* cited by examiner

*Primary Examiner* — Sinh Tran
*Assistant Examiner* — Zhenzhen Wu
(74) *Attorney, Agent, or Firm* — Young & Thompson

(57) ABSTRACT

An imaging device for an imaging apparatus adapted to image an object through an image formation lens includes: a light receiving section having a plurality of light receiving elements; a microlens section having a plurality of microlenses respectively provided corresponding to a plurality of the light receiving elements to make the corresponding light receiving elements receive an object light beam that passed through the image formation lens; a control section adapted to control shapes of the plurality of the microlenses so as to control pupil regions in an exit pupil of the image formation lens that pass a light beam that should be received by each of the plurality of the light receiving elements; and an image signal generation section adapted to generate an image signal of an image of the object based on imaging signals of the plurality of the light receiving elements.

20 Claims, 15 Drawing Sheets

B

IMAGING DEVICE

CROSS-REFERENCE TO RELATED APPLICATIONS

This application is a continuation application and claims the priority benefit under 35 U.S.C. §120 of PCT Application No. PCT/JP2011/070797 filed on Sep. 13, 2011 which application designates the U.S., and also claims the priority benefit under 35 U.S.C. §119 of Japanese Patent Application No. 2010-224252 filed on Oct. 1, 2010, which applications are all hereby incorporated by reference in their entireties.

TECHNICAL FIELD

The present invention relates to an imaging device.

BACKGROUND ART

Regarding an optical element provided in the vicinity of an image sensor, there are known, for example, technologies disclosed in PTL 1 and PTL 2.

PTL 1 discloses a parallax image input apparatus adapted to selectively image information that passed through different positions in an image formation means that forms images of an outside, to convert the image information to image data strings, and to store the converted image data strings. According to the technology of PTL 1, a plurality of images from different viewpoints can be captured.

PTL 2 discloses a digital camera adapted to deflect incident luminous flux into two directions by a deflection means, to detect two images by the luminous flux with image sensors, to calculate, based on an image shift amount obtained from detected image positions, a focus adjustment state of an object image adjusted by an imaging lens, and to move the imaging lens to a focus position. According to the technology of PTL 2, focus adjustment may quickly be carried out by one image detecting operation.

However, in the technology of PTL 1, a pupil is spatially divided by microlenses and light receiving cells for the luminous flux incident into a general image formation lens, and only a single focus is present. Therefore, a focus adjustment mechanism is needed in order to acquire images with different focal lengths. The focus adjustment mechanism is also needed in the case of PTL 2.

If the focus adjustment mechanism is incorporated in the imaging lens in order to take images with different focal lengths, a problem of upsizing of a drive unit arises.

As a solution to the problem, PTL 3 discloses an imaging optical system, in which one or two lens surfaces in an imaging lens system have a difference in curvature between in an inner region and in an outer region that are coaxial with an optical axis, and which satisfies $0.3 \leq f2/f1 \leq 0.9$ wherein f1 represents a focal length of the entire system with the curvature of the outer region and f2 represents a focal length of the entire system with the curvature of the inner region.

Moreover, PTL 4 discloses a technology for switching, with use of fluid prisms, the focus of a multifocal lens which has two lens regions different in focal length.

According to the technologies in PTL 3 and PTL 4, images with different focal lengths can be taken without the use of the focus adjustment mechanism.

CITATION LIST

Patent Literature

{PTL 1}
Japanese Patent No. 3753201
{PTL 2}
Japanese Patent Application Laid-Open No. 2005-164983
{PTL 3}
Japanese Patent Application Laid-Open No. 2003-270526
{PTL 4}
Japanese Patent Application Laid-Open No. 2007-193020

SUMMARY OF INVENTION

Technical Problem

It is necessary to utilize as much as possible not only focus adjustment but also various optical properties that the photographic lens has.

Solution to Problem

In order to solve the problem, one aspect of the present invention is an imaging device for an imaging apparatus adapted to image an object through an image formation lens including: a light receiving section having a plurality of light receiving elements; a microlens section having a plurality of microlenses respectively provided corresponding to a plurality of the light receiving elements to make the corresponding light receiving elements receive an object light beam that passed through the image formation lens; a control section adapted to control shapes of the plurality of the microlenses so as to control pupil regions in an exit pupil of the image formation lens that pass light beams that should be received by each of the plurality of the light receiving elements; and an image signal generation section adapted to generate an image signal of an image of the object based on imaging signals of the plurality of the light receiving elements.

The plurality of the microlenses may each be fluid microlenses formed from an interface between a first fluid and a second fluid which are different in refractivity from each other, and the control section may control the shapes of the plurality of the microlenses by controlling shapes of the interfaces.

The control section may control the shapes of the microlenses to be changed from a shape having first refractive power to a shape having second refractive power that is larger than the first refractive power so as to limit sizes of the pupil regions that pass the light beams that should be received by the plurality of the light receiving elements.

The imaging device may further include a deflection section having a plurality of first deflection optical elements, the first deflection optical elements being provided respectively corresponding to a plurality of first light receiving elements, out of the plurality of the light receiving elements, to make the corresponding first light receiving elements receive, via the corresponding microlenses, an object light beam that passed through a first pupil region in the exit pupil when the plurality of the microlenses are controlled to be in the shape having the second refractive power.

The deflection section may further include a plurality of second deflection optical elements, the second deflection optical elements being provided respectively corresponding to a plurality of second light receiving elements, out of the plurality of the light receiving elements, to make the corresponding second light receiving elements receive, via the corresponding microlenses, an object light beam that passed through a second pupil region in the exit pupil when the plurality of the microlenses are controlled to be in the shape having the second refractive power.

The plurality of the first deflection optical elements and the plurality of the second deflection optical elements may each be fluid prism elements that form a prism interface from an interface between a third fluid and a fourth fluid which are different in refractivity from each other, the control section may switch between a first imaging mode and a second imaging mode, the first imaging mode being adapted for imaging by controlling the plurality of the microlenses to be in the shape having the first refractive power while controlling the prism interface to be vertical to an optical axis of the image formation lens, the second imaging mode being adapted for imaging by controlling the plurality of the microlenses to be in the shape having the second refractive power while controlling the prism interface to be inclined to the optical axis of the image formation lens.

In the case of taking images of different viewpoints, the control section may control the imaging mode to be the second imaging mode, and the image signal generation section may generate image signals of the images of the different viewpoints based on imaging signals of the plurality of the first light receiving elements and imaging signals of the plurality of the second light receiving elements.

The image formation lens may be a lens having focal lengths different in every region, so that an object light beam that passed through a region of the image formation lens having a first focal length passes the first pupil region, while an object light beam that passed through a region of the image formation lens having a second focal length passes the second pupil region, in the case of imaging an object with different focal lengths, the control section may control the imaging mode to be the second imaging mode, and the image signal generation section may generate image signals of an image with the first focal length and an image with the second focal length based on imaging signals of the plurality of the first light receiving elements and imaging signals of the plurality of the second light receiving elements.

The microlens section may have: a lens housing adapted to hold therein the first fluid and the second fluid; and a divider plate adapted to divide an inside of the lens housing into a first fluid region filled with the first fluid and a second fluid region filled with the second fluid, wherein the divider plate may have a plurality of through holes formed corresponding to the plurality of the light receiving elements, the plurality of the microlenses may be formed from an interface between the first fluid and the second fluid in each of the plurality of the through holes, and the control section may control the shapes of the microlenses by controlling internal pressure of the first fluid region.

The deflection section may have: a prism housing adapted to hold the third fluid and the fourth fluid; and a divider plate adapted to divide an inside of the prism housing, along the optical axis, into a third fluid region filled with the third fluid and a fourth fluid region filled with the fourth fluid, wherein the divider plate may have a plurality of through holes formed corresponding to positions at which the plurality of the fluid prism elements are formed, and the control section may control an inclination of the prism interface with respect to the optical axis by controlling, with internal pressure of the third fluid region, a position of the prism interface in a first lateral portion of the plurality of the through holes and a position of the prism interface in a second lateral portion that is opposed to the first lateral portion.

It is to be noted that foregoing summary of invention does not include all the required characteristics of the present invention. Subcombinations of these characteristic groups may also be embraced in the invention.

Advantageous Effects of Invention

According to the present invention, images can be obtained not only by focus adjustment but also according to various optical properties that the microlens has.

DESCRIPTION OF EMBODIMENTS

While the present invention is to be described hereinafter through embodiments of the invention, it should be understood that the following embodiments do not limit the invention defined by the claims. It should also be understood that not all the combinations of the characteristics described in the embodiments are necessarily indispensable for the solution of the invention.

Figure 1:
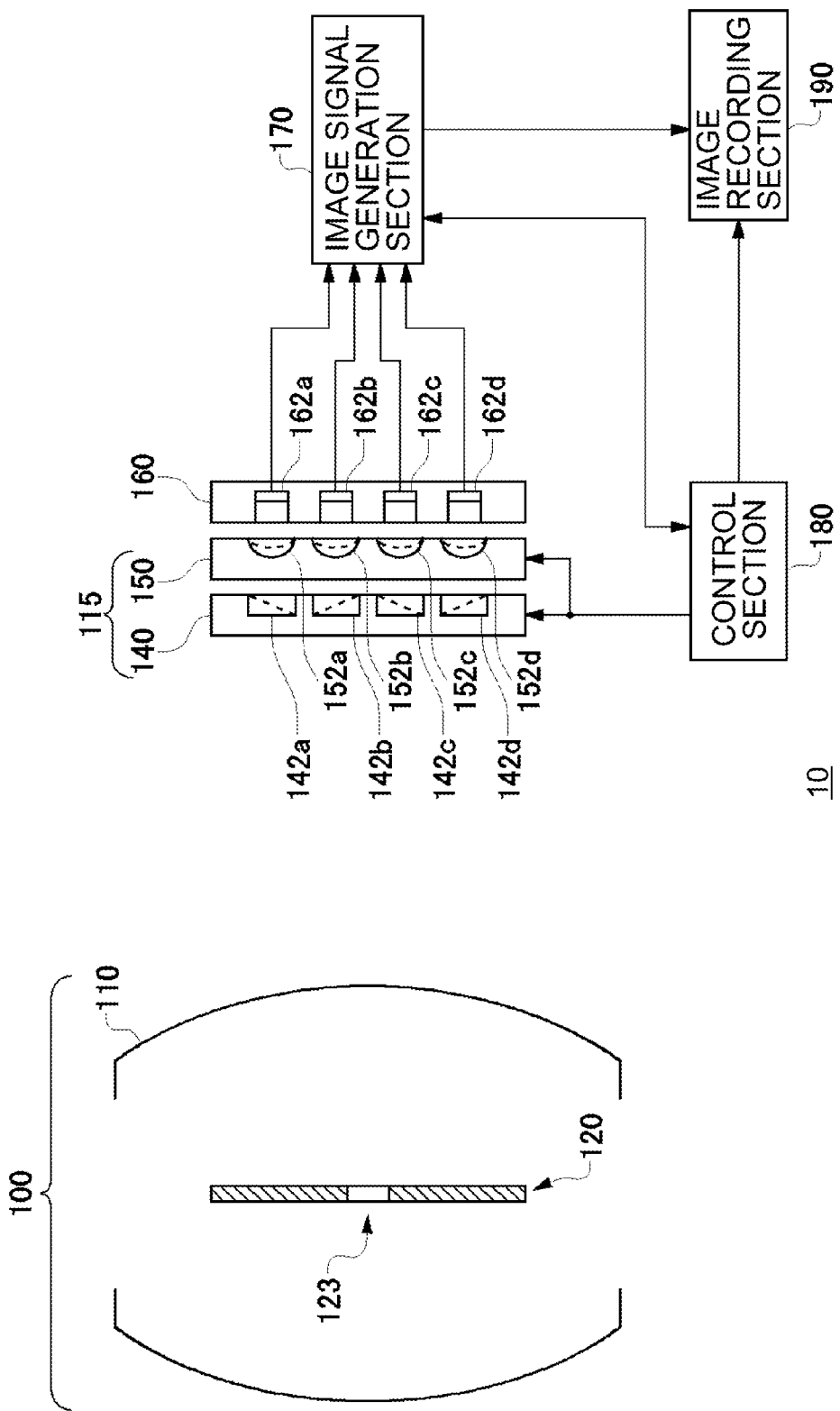
FIG. 1 is a view schematically showing one example of a block configuration of an imaging apparatus 10.

FIG. 1 schematically shows one example of a block configuration of an imaging apparatus 10. The imaging apparatus 10 according to the present embodiment provides a device which can utilize various optical properties that a photographic lens has. The imaging apparatus 10 includes a lens system 100, an optical device 115, a light receiving section 160, an image signal generation section 170, a control section 180, and an image recording section 190. The imaging apparatus 10 may be imaging equipment, such as mobile phones with a camera function and digital cameras. It is to be noted that a functional block including the lens system 100, the optical device 115, the light receiving section 160, the image signal generation section 170 and the control section 180 may be provided as an imaging device for the imaging apparatus 10. The imaging device may be an imaging module built into imaging equipment.

The lens system 100 is a single image formation lens system which images a light beam from an object. The lens system 100 includes one or more lenses 110. An object light beam that passed through the lens system 100 passes through the optical device 115, before being received by the light receiving section 160.

The optical device 115 has a deflection section 140 and a microlens section 150. The deflection section 140 includes a plurality of prism elements 142a-142d as one example of the deflection optical elements. The microlens section 150 includes a plurality of microlenses 152a-152d. The light receiving section 160 has a plurality of light receiving elements 162a-162d. In this drawing, four light receiving elements 162a-162d, four microlenses 152a-152d, and four prism elements 142a-142d are illustrated for easy understanding, though the drawing not necessarily indicate that only four optical elements are respectively provided. It should naturally be understood that arbitrary numbers of optical elements are respectively provided for taking images of an object. A plurality of the microlenses 152a-152d may generally be referred to as the microlens 152 or a plurality of the microlenses 152. A plurality of the light receiving elements 162a-162d may also generally be referred to as the light receiving element 162 or a plurality of the light receiving elements 162. Similarly, other optical elements may also generally be referred with reference numerals with their suffixes being omitted.

A plurality of the light receiving elements 162 may form MOS-type image sensors. A plurality of the light receiving elements 162 may form solid-state image sensors such as CCD-type image sensors besides the MOS-type image sensors.

The microlenses 152 are provided each corresponding to a plurality of the light receiving elements 162. A plurality of the microlenses 152 make the corresponding light receiving elements 162 receive an object light beam that passed through the lens system 100. More specifically, a plurality of the microlenses 152 re-image an object light beam which was imaged by the lens system 100, and the corresponding light receiving elements 162 are made to receive the images. The illustrated microlenses 152a-152d are each provided corresponding to the light receiving elements 162a-162d. The microlens 152a re-images an object light beam imaged by the lens system 100, and the light receiving element 162a is made to receive the image. Similarly, the microlenses 152b-152d respectively re-image an object light beam imaged by the lens system 100, and the light receiving elements 162b-162d are made to receive the images.

The microlenses 152 can adjust the shape of optical surface that functions as a lens. For example, the microlenses 152 can change the shape of the optical surface from a shape having first refractive power to a shape having second refractive power that is larger than the first refractive power. In this drawing, the shape having the second refractive power is schematically shown with a solid line, while the shape having the first refractive power is schematically shown with a broken line.

When the microlenses 152 are controlled to be in the state having the second refractive power, the microlenses 152 limit light beams that each of the light receiving elements 162 can receive to those that passed through a partial region of the exit pupil 120. For example, when the microlenses 152 are controlled to be in the state having the second refractive power, the microlenses 152 may make each of the light receiving elements 162 receive a light beam which passed through a region having an area of ¼ or less of the exit pupil 120. When the microlenses 152 are controlled to be in the state having the first refractive power, the microlenses 152 can make each of the light receiving elements 162 receive a light beam which passed through a region of the exit pupil 120 larger than the region in the case where the microlenses 152 are controlled to be in the state having the second refractive power. For example, when the microlenses 152 are controlled to be in the state having the first refractive power, the microlenses 152 can make each of the light receiving elements 162 receive a light beam which passed through a region having an area larger than ¼ of the exit pupils 120. The control section 180 controls the shapes of the microlenses 152 so as to control the size of the exit pupil 120 through which luminous flux going to each of the light receiving elements 162 passes. Accordingly, images can be obtained not only by focus adjustment but also according to various optical properties that the microlens 152 has.

The prism elements 142 are provided corresponding to a plurality of the light receiving elements 162. The prism elements 142, the microlenses 152, and the light receiving elements 162 are provided in one-to-one relation. For example, the prism element 142a is provided corresponding to the microlens 152a and the light receiving element 162a. Of the prism elements 142, the microlenses 152, and the light receiving elements 162, a group of the optical elements relating to each other is distinguished by suffixes "a" to "d" added to their reference numerals.

The prism elements 142 can adjust the shape of the optical surface that functions as a prism. For example, the prism elements 142 can change the angle of at least one optical surface in an optical axis direction of the lens system 100. The angle of the optical surface may referred to as a prism angle. In this drawing, the prism elements 142 are schematically shown with a solid line when both the optical surfaces are in the shape vertical to the optical axis, i.e., when a prism effect is not produced. The prism elements 142 are schematically shown with a broken line when one optical surface is in the shape inclined from a plane vertical to the optical axis.

When the prism elements 142 are controlled to be in the shape having no prism effect, the prism elements 142 make the light receiving elements 162 receive a light beam which passed through a pupil region around the optical axis in the exit pupil 120. As described above, the size of the pupil region is controlled by the refractive power of the microlenses 152. By controlling the prism angle of the prism elements 142, the position of the pupil region on the exit pupil 120 can be controlled by the prism elements 142. More specifically, when the prism elements 142 are controlled in the state of having the prism effect, the prism elements 142 can make the light receiving elements 162 receive a light beam that passed through a region on the exit pupil 120 which is around a position corresponding to the prism angle. Thus, the prism elements 142 can control the direction of the luminous flux to be received by the light receiving elements 162. By controlling the inclination of the optical surfaces of the prism elements 142, the control section 180 can control the position of the exit pupil 120 through which the luminous flux that goes to the light receiving elements 162 passes.

With reference to this drawing, a description is given of the state where the prism elements 142 are controlled to have no prism effect as shown with a solid line, and the microlenses 152 are controlled to have the second refractive power. A mode for imaging in this state is referred to as a high-resolution imaging mode. Since the prism elements 142 do not have the prism effect as described above, the pupil region that passes light beams that can be received by the light receiving elements 162 is a region around the optical axis on the exit pupil 120. In contrast, since the microlenses 152 have the second refractive power, light beams to be received by the microlenses 152 are limited to those that passed through a relatively small pupil region. Therefore, the luminous flux that is incident into the light receiving elements 162 are narrowed down to the luminous flux that passes through a relatively small central pupil region 123 including the optical axis.

According to this imaging mode, the optical device 115 can use low aberration portions of the lens system 100, so that a signal in a high spatial frequency domain from an object is highly transmitted to the light receiving section 160. Moreover, MTF characteristics of the imaging system can be enhanced. Accordingly, high-resolution images can be provided. Moreover, since an effect can be acquired which is equivalent to the effect produced in the state where an image is taken by narrowing down the pupil of the image formation lens 110, a depth of field can be expanded.

The light receiving elements 162 output imaging signals with the strength corresponding to a light receiving amount to the image signal generation section 170. The image signal generation section 170 generates, based on the imaging signals fed from the light receiving elements 162, image signals indicating an image by the light beam that passed through a vicinity of the optical axis. The image recording section 190 acquires the image signals generated by the image signal generation section 170 and records the image signals as image data. The image recording section 190 may record the image data in a nonvolatile memory. The image recording section 190 may have the nonvolatile memory. The nonvolatile memory may also be an external memory detachably provided on the imaging apparatus 10. The image recording section 190 may output the image data to the outside of the imaging apparatus 10. The image indicated by the image signals generated by the image signal generation section 170 and the image indicated by the image data recorded in the image recording section 190 may simply referred to as images.

It is to be noted that in the present drawing, the central pupil region 123 is illustrated with white blank space for the purpose of intelligibly showing that the light receiving elements 162 receive a light beam that passed through the central pupil region 123 of the exit pupil 120 due to the functions of the microlenses 152 and the prism elements 142. The regions other than the central pupil region 123 are illustrated with slanting lines. In the subsequent drawings, a specific partial region in the exit pupil 120 may be illustrated with white blank space for the purpose of intelligibly showing that the light receiving elements 162 receive a light beam that passed through the specific partial region of the exit pupil 120, and other regions may be illustrated with slanting lines. This does not mean that object light beams do not pass through the slanting line regions of the exit pupil 120.

Figure 2:
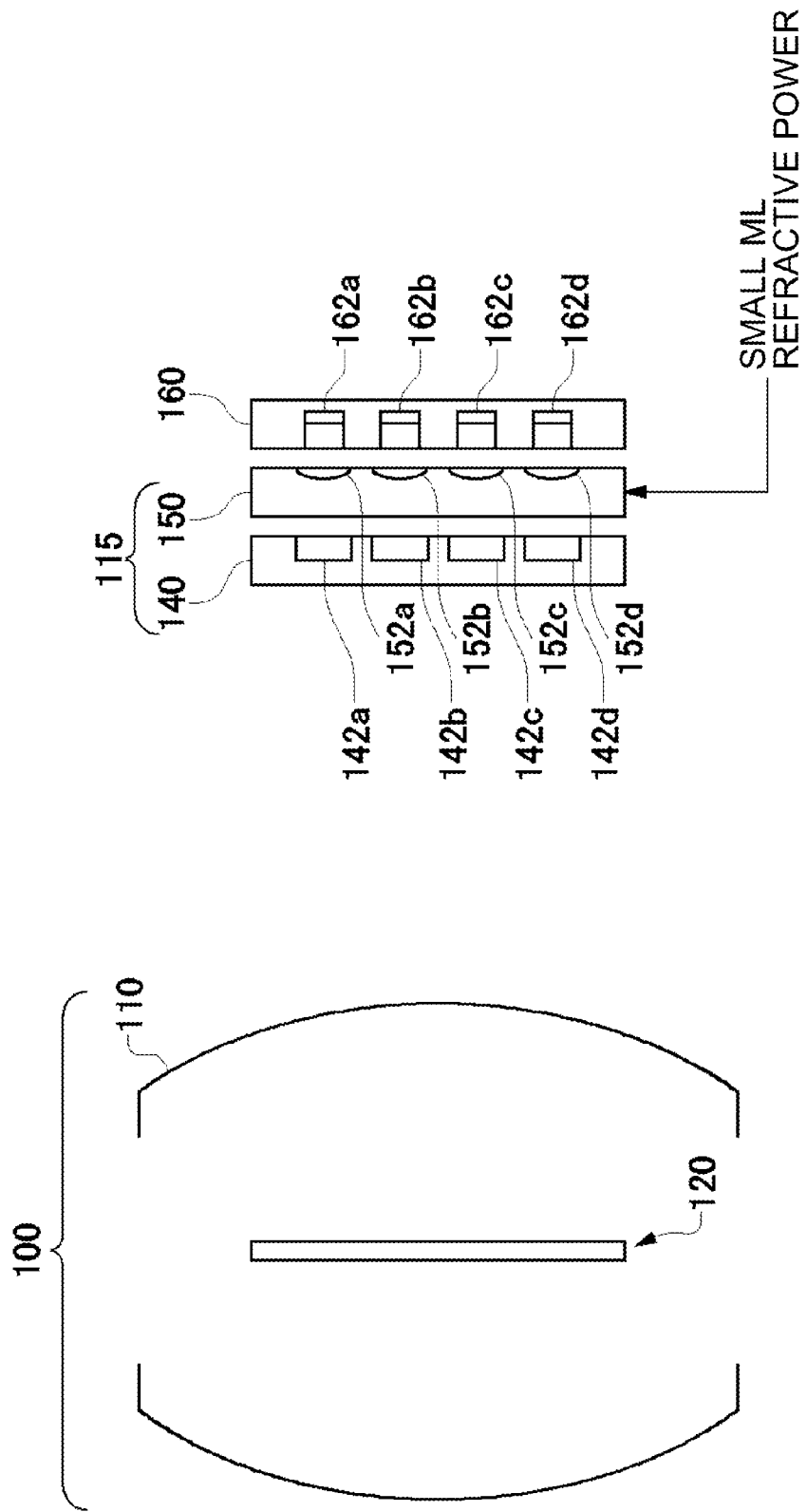
FIG. 2 is a view schematically showing one example of an optical device 115 in another imaging mode.

FIG. 2 schematically shows one example of the optical device 115 in another imaging mode. This example shows one example of the mode adapted to utilize object light beams for imaging with a high utilization rate. The optical device 115 of this example is different in optical property from the optical device 115 shown in FIG. 1 in the point that the microlenses 152 have the first refractive power that is smaller than the second refractive power.

In the state having the first refractive power, the microlenses 152 can make the light receiving elements 162 receive light beams that passed through a relatively wide range of the exit pupil 120, that is, substantially the entire surface of the exit pupil 120 for example. To express that the luminous flux going to the light receiving elements 162 is not substantially limited; the entire surface of the exit pupil 120 is illustrated with white blank space in this drawing. In the case of having the first refractive power, the microlenses 152 focus an object light beam, which goes to a region around a photoelectric conversion section included in the light receiving element 162, to the photoelectric conversion section. Accordingly, as compared with the case where the microlenses 152 do not have a lens effect, object light beams that were incident into the light receiving section 160 can efficiently be utilized for imaging.

According to this imaging mode, the optical device 115 can utilize, for imaging, the light beam from the object without limiting the amount thereof. This makes it possible to relatively reduce noise components in comparison with signal components in the imaging light beam. In an image region where an object is unfocused in particular, image signal components smoothly change, which makes noise more notable. However, according to this imaging mode, a larger amount of light can be transmitted to the light receiving elements 162 with respect to the unfocused image region. Thus, in this imaging mode, an SN ratio can be enhanced and a high definition image with few noises can be obtained. This imaging mode is referred to as a low noise imaging mode.

Thus, the control section 180 controls the shapes of a plurality of the microlenses 152 so as to control pupil regions in the exit pupil of the lens system 100 that pass light beams that should be received by each of a plurality of the light receiving elements 162. More specifically, the control section 180 can control the shapes of the microlenses 152 to be changed from a shape having the first refractive power to a shape having the second refractive power that is larger than the first refractive power so as to limit the size of the pupil regions that pass the light beams that should be received by a plurality of the light receiving elements 162.

Figure 3:
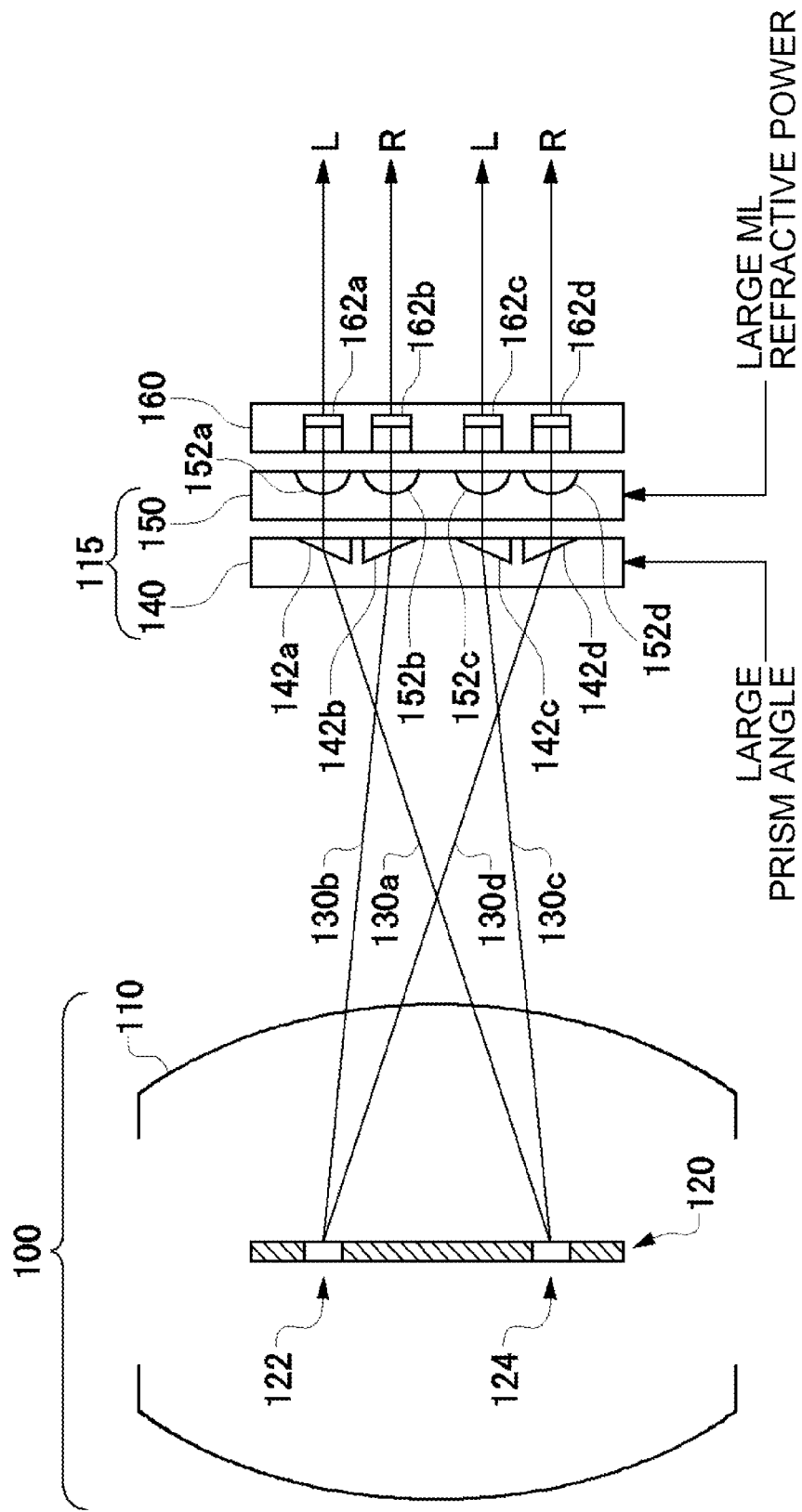
FIG. 3 is a view schematically showing one example of the optical device 115 in still another imaging mode.

FIG. 3 schematically shows one example of the optical device 115 in still another imaging mode. This example is one example of a multi-view imaging mode which is an imaging mode for taking multi-view images. The optical device 115 of this example is different in optical property from the optical device 115 shown in FIG. 2 in the point that the prism elements 142 have an optical surface inclined with respect to a plane vertical to the optical axis.

The prism element 142a has a prism angle which makes the light receiving element 162a receive, via the microlens 152a, an object light beam 130a that passed through a left pupil region 124 in the exit pupil 120 of the lens system 100. Moreover, the prism element 142c has a prism angle which makes the light receiving element 162c receive, via the microlens 152c, an object light beam 130c that passed through the left pupil region 124 in the exit pupil 120 of the lens system 100. Meanwhile, the prism element 142b has a prism angle which makes the light receiving element 162b receive, via the microlens 152, an object light beam 130b that passed through a right pupil region 122 in the exit pupil 120 of the lens system 100. The prism element 142d also has a prism angle which makes the light receiving element 162d receive, via the microlens 152d, an object light beam 130d that passed through the right pupil region 122 in the exit pupil 120 of the lens system 100.

Accordingly, light beams that the light receiving elements 162a and 162c can receive are limited to those that passed through the left pupil region 124, while light beams that the light receiving elements 162b and 162d can receive are limited to those that passed through the right pupil region 122. Therefore, the image signal generation section 170 generates image signals of a left view image based on imaging signals from a part of the light receiving elements 162, like the light receiving elements 162a and 162c that receive a light beam that passed through the left pupil region 124. The image signal generation section 170 also generates image signals of a right view image based on imaging signals from a part of the light receiving elements 162, like the light receiving elements 162b and 162d that receive a light beam that passed through the right pupil region 122.

It is to be noted that the left pupil region 124 and the right pupil region 122 are respectively one example of the first pupil region and the second pupil region. The first pupil region and the second pupil region are not limited to the illustrated right pupil region 122 and left pupil region 124. The first pupil region and the second pupil region should just be regions independent of each other in the exit pupil 120. When the first pupil region is a region which does not include a position of the optical axis, the second pupil region may or may not include the position of the optical axis as long as it is a region different from the first pupil region.

More specifically, the deflection section 140 has a plurality of first deflection optical elements adapted to make corresponding first light receiving elements, out of a plurality of the light receiving elements 162, respectively receive via corresponding microlenses 152 an object light beam 130 that passed through the first pupil region in the exit pupil 120 in the case where a plurality of the microlenses 152 are controlled to be in the shape having the second refractive power. Moreover, the deflection section 140 has a plurality of second deflection optical elements adapted to make corresponding second light receiving elements respectively receive via corresponding microlenses an object light beam 130 that passed through the second pupil region in the exit pupil 120 in the case where a plurality of the microlenses 152 are controlled to be in the shape having the second refractive power.

In the case where the second light receiving elements are made to receive a light beam that passed through a pupil region in the vicinity of the optical axis such as the central pupil region 123, the shape of the prism elements 142 corresponding to the second light receiving elements may be formed into a shape having no prism effect as shown in FIG. 2. It is also possible to employ the deflection section 140 configured so as not to have the prism elements 142 that correspond to the second light receiving elements.

In the case of taking images of different viewpoints, the control section 180 controls the imaging mode to be a multi-view imaging mode as shown in the drawing. The image signal generation section 170 generates image signals of images of different viewpoints based on imaging signals of a plurality of the first light receiving elements and imaging signals of a plurality of the second light receiving elements.

According to this imaging mode, the refractive power of the microlenses 152 limits the size of the pupil that passes light beams that can be received by a plurality of the light receiving elements 162. Since the prism elements 142 can control the positions of the pupil regions that pass the light beams that can be received by each of the light receiving elements 162, the pupil regions can appropriately be separated. Accordingly, the optical device 115 can obtain a left view image and a right view image in one shot with use of the single lens system 100. This makes it possible to achieve compact mounting of a multi-view photographing function.

Figure 4:
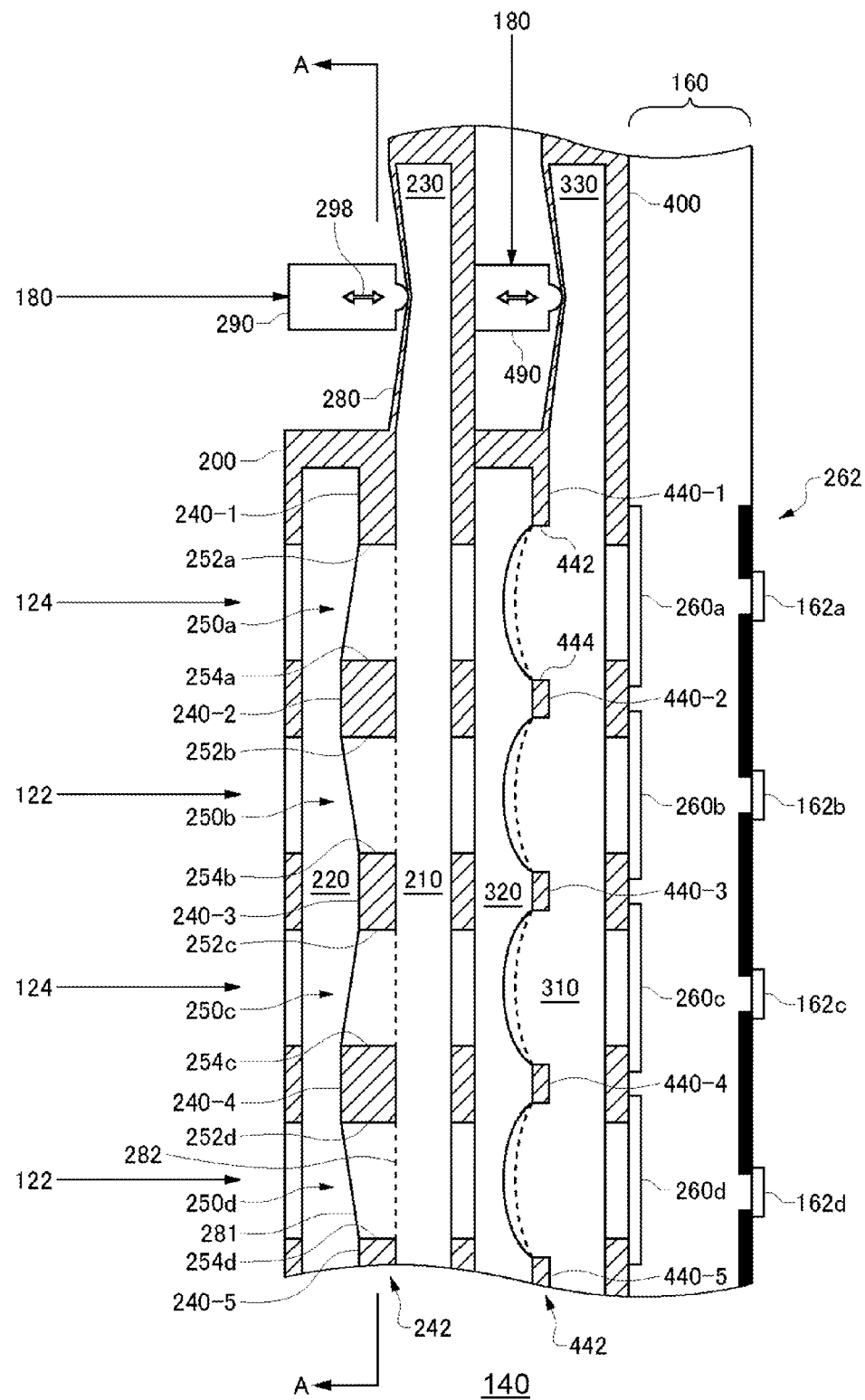
FIG. 4 is a view schematically showing one example of a configuration of a deflection section 140 and a microlens section 150.

FIG. 4 schematically shows one example of a configuration of the deflection section 140 and the microlens section 150. This example is one example of a configuration for implementing three imaging modes described in reference to FIGS. 1 to 3. In this example, a plurality of the prism elements 142 included in the deflection section 140 are fluid prism elements formed from fluid interfaces different in refractivity from each other. Prism angles of the prism elements 142 are defined by angles of the fluid interfaces.

The deflection section 140 has: a housing 200 adapted to hold a first fluid and a second fluid; a divider plate 242; and a driving section 290. The divider plate 242 divides the inside of the housing 200, along the optical axis of the lens system 100, into a first fluid region 210 filled with a first fluid and a second fluid region 220 filled with a second fluid. The first fluid and the second fluid are different in refractivity from each other and have a property of being immiscible with each other in a contact state like water and oil. Examples of a combination of the first fluid and the second fluid include a combination of PDMS (Poly-Dimethyl-Siloxane) and pure water. Here, it is assumed that the first fluid is larger in refractivity than the second fluid. Preferably, the first fluid and the second fluid are substantially equal in density.

The divider plate 242 has a plurality of through holes 250a-250d formed corresponding to the positions at which a plurality of the prism elements 142a-142d are formed. The prism elements 142a-142d are formed at the positions where the through holes 250a-250d are respectively formed. The shape of the through hole 250 viewed from an object-side surface or an image-side surface of the housing 200 may be a square, a rectangular, a trapezoid, a circle, an ellipse, or the like, and may be other various shapes.

Translucent portions made of a transparent material such as glass are formed on the object-side surface and image-side surface of the housing 200. The translucent portions are formed at the positions corresponding to the through holes 250, the microlenses 152, and the light receiving elements 162, so that an object light beam passes through the translucent portion formed on the object-side surface, the through holes 250, and the translucent portion formed on the image-side surface before coming incident into the corresponding microlenses 152. It is to be noted that the entire object-side surface and image-side surface of the housing 200 may be made of a transparent material such as glass.

The divider plate 242 includes divider sections 240-1 to 240-5. The through hole 250 is formed from a space between the divider sections 240 that are opposed to each other. The divider sections 240 prevent contact between the first fluid and the second fluid. The first fluid and the second fluid come into contact with each other inside the through hole 250 and form an interface that serves as the prism element 142.

The through hole 250a has a lateral surface portion 252a and a lateral surface portion 254a. The lateral surface portion 252a and the lateral surface portion 254a are respectively lateral surface portions of the divider section 240-1 and the divider section 240-2 that are opposed to each other. The lateral surface portion 252a has a first thickness along a direction of the optical axis of the lens system 100, while the lateral surface portion 254a has a second thickness along the direction of the optical axis of the lens system 100. In short, the through hole 250a is formed so as to be surrounded with lateral surfaces including the lateral surface portion 252a and the lateral surface portion 254a of the divider plate 242 which are different in thickness from each other. For example, when the through hole 250a has a square opening, the through hole 250a is formed so as to be surrounded with the lateral surface portion 252a, the lateral surface portion 254a, and two lateral surface portions which join the lateral surface portion 252a and the second lateral surface portion 254a. Here, the second thickness is assumed to be larger than the second thickness.

The through hole 250b has a lateral surface portion 252b and a lateral surface portion 254b. The lateral surface portion 252b and the lateral surface portion 254b are respectively lateral surface portions of the divider section 240-2 and the divider section 240-3 that are opposed to each other. The lateral surface portion 252b has the second thickness along the optical axis direction of the lens system 100, while the lateral surface portion 254b has the first thickness along the optical axis direction of the lens system 100. Unlike the through hole 250a, the through hole 250b has the lateral surface portion 252b with the first thickness and the lateral surface portion 254b with the second thickness in order in a direction of a plurality of the through holes 250 being arrayed. Since other aspects are the same as those of the through hole 250a, a description thereof is omitted.

The through hole 250c has a lateral surface portion 252c and a lateral surface portion 254c. The lateral surface portion 252c and the lateral surface portion 254c are respectively lateral surface portions of the divider section 240-3 and the divider section 240-4 that are opposed to each other. The through hole 250c, which is similar in shape to the through hole 250a, has the first thickness along the optical axis direction of the lens system 100, while the lateral surface portion 254c has the second thickness along the optical axis direction of the lens system 100. The through hole 250d has a lateral surface portion 252d and a lateral surface portion 254d. The lateral surface portion 252d and the lateral surface portion 254d are respectively lateral surface portions of the divider section 240-4 and the divider section 240-5 that are opposed to each other. The through hole 250d, which is similar in shape to the through hole 250b, has the second thickness along the optical axis direction of the lens system 100, while the lateral surface portion 254d has the first thickness along the optical axis direction of the lens system 100. In short, the divider plate 242 has a column of through holes which are composed of a through hole having the shape of the through hole 250a and a through hole having the shape of the through hole 250b alternately formed in a repeated manner.

When pressure of the first fluid filled in the first fluid region 210 is set at a specific pressure, a planate interface is formed corresponding to the pressure so that a pressure difference between the fluids and surface tension are balanced. When the pressure of the first fluid is set at the first pressure so as to be balanced in the state where the second fluid in filled in each of the through holes 250, a fluid interface shown with a broken line in the drawing, like the prism element 282, is formed. For example, the interface is supported, in each of the through holes 250, by an end of the lateral surface portion 252a on the fluid region 210 side and an end of the second lateral surface portion 254a on the fluid region 210 side.

Since the divider plate 242 has a planate end face on the first fluid side, and the end face is parallel to the image-side housing 200, the interface shown with a broken line has substantially no prism effect. Accordingly, the light receiving elements 162 can receive the light beam that passed through a region of the exit pupil 120 around the optical axis. In the case of imaging in the imaging mode described in FIGS. 1 and 2, the control section 180 should just control the pressure of the fluid region 210 so that the interface is maintained in the shape shown with a broken line in this drawing.

On the contrary, when the pressure of the first fluid is increased from the first pressure to the second pressure so as to be balanced in the state where the first fluid is filled in each of the through holes 250, the position of the interface is moved to the second fluid side, and an interface shown with a solid line in the drawing, like the prism element 281, is formed. For example, the interface is supported, in each of the through holes 250a, by an end of the lateral surface portion 252a on the second fluid region 220 side and an end 262-1 of the divider plate 242a on the fluid region 210 side. The interface has an inclination corresponding to the thickness of the lateral surface portion which forms each of the through holes 250. Assuming that an inclination of the interface in the through hole 250a and an inclination of the interface in the through hole 250b are respectively referred to as a first inclination and a second inclination, there is formed a prism column in which a prism angle with the first inclination and a prism angle with the second inclination are alternately repeated. Thus, the control section 180 may control the inclination of the interface with respect to the optical axis by controlling the internal pressure of the fluid region 210 that holds the first fluid.

When the prism column is formed, the light receiving element 162a and the light receiving element 162c corresponding to the through hole 250a and the through hole 250c receive a light beam that passed through the left pupil region 124 due to the functions of the microlenses 152 and the prism elements. On the contrary, the light receiving element 162b and the light receiving element 162d corresponding to the through hole 250b and the through hole 250d receive a light beam that passed through the right pupil region 122. Accordingly, the image signal generation section 170 can generate a right view image and a left view image by selecting the light receiving elements in an alternate manner to generate image signals.

The control section 180 controls the pressure of the first fluid by controlling the pressure inside the fluid region 230 that communicates with the first fluid region 210. More specifically, the housing 200 has an elastic surface 280 which is in contact with the first fluid inside the fluid region 230. Moreover, the deflection section 140 has a driving section 290 adapted to displace the elastic surface 280 so as to control a volume of the fluid region 230. As the driving section 290, a piezoelectric element may be provided. The piezoelectric element may be a piezo device. The control section 180 controls the voltage applied to the piezoelectric element to change the shape of the piezoelectric element, so that a top end of the piezoelectric element that comes into contact with the elastic surface 280 is displaced in an expansion and contraction direction 298.

In the case of moving the interface between the first fluid and the second fluid toward the object side along the lateral surface portion of the through hole 250, the control section 180 displaces the top end of the driving section 290 in a direction of reducing the volume of the fluid region 230. As a consequence, the internal pressure of the first fluid increases and the interface moves toward the object side. In the case of moving the interface toward the image side along the lateral surface portion of the through hole 250, the control section 180 displaces the top end of the driving section 290 in a direction of increasing the volume of the fluid region 230. As a consequence, the internal pressure of the first fluid decreases and the interface moves toward the image side.

Thus, the control section 180 controls, with the internal pressure of the fluid region 210, the position of the interface in the first lateral portion of the through hole 250 and the position of the interface in the second lateral portion that is opposed to the first lateral portion so as to control the inclination of the interface with respect to the optical axis, as a result of which the inclination of the prism elements can be controlled.

A description is given of the configuration of the microlens section 150 in this example. In this example, a plurality of the microlenses 152 included in the microlens section 150 are fluid microlenses formed from an interface between fluids which are different in refractivity from each other. The refractive power of the microlens 152 is defined by the shape of the interface.

The microlens section 150 has: a housing 400 adapted to hold a first fluid and a second fluid; a divider plate 442; and a driving section 490. An object-side surface of the housing 400 and an image-side surface of the housing 200 may be integrally formed. The divider plate 442 divides the inside of the housing 400, along the optical axis of the lens system 100, into a first fluid region 310 filled with a first fluid and a second fluid region 320 filled with a second fluid. While the interface of the prism element 142 and the interface of the microlens 152 may be formed from the same combination of fluids as in this example, it should naturally be understood that a different combination of fluids may be used for the prism element 142 and the microlens 152.

Translucent portions made of a transparent material such as glass are formed on the object-side surface and image-side surface of the housing 400 as in the housing 200. Like the divider plate 242, the divider plate 442 has a plurality of through holes formed corresponding to positions at which a plurality of the light receiving elements 162 are formed. A plurality of the microlenses 152 may be formed from an interface between the first fluid and the second fluid in each of a plurality of the through holes. It is to be noted that the interface of the microlens 152 is formed in the same process as in the interface of the prism element 142. Accordingly, a description is given of the configuration of the microlens section 150 with a focus on the difference from the deflection section 140.

The divider plate 442 includes divider sections 440-1 to 440-5. The first fluid and the second fluid come into contact with each other on the side closer to the fluid region 320 than the divider plate 442, and form an interface that serves as the microlens 152. Unlike the divider plate 242, the divider plate 442 may have an identical thickness in the optical axis direction. The divider plate 442 has a surface parallel to the plane that is vertical to the optical axis at least on the fluid region 320 side.

The shapes of the microlenses 152 are controlled by controlling the internal pressure of the fluid region 310 as in the case of the prism elements 142. Assuming that the pressure of a planate interface formed on both the ends of the through holes on the fluid region 320 side is referred to as standard pressure, the first fluid filled in the fluid region 310 is maintained at the standard pressure or higher. When the pressure of the first fluid is made larger than the standard pressure, an interface as shown with a broken line in this drawing is formed. In short, an arch-shaped interface is formed to have a peak on the object side in the vicinity of the center of the through hole while the position of the interface is supported in both the ends of the through hole on the fluid region 320 side. In the state shown with a broken line in this drawing, a plurality of the microlenses 152 respectively have the first refractive power.

If the pressure is increased higher, an interface shown with a solid line in this drawing is formed. In short, while the position of the interface is supported by both the ends of the through hole on the fluid region 320 side, the arch-shaped interface is formed to have a peak positioned closer to the object side in the through hole. In the state shown with a solid line in this drawing, a plurality of the microlenses 152 respectively have the second refractive power.

In the case of imaging in the imaging mode described in FIG. 2, the control section 180 should just control the pressure of the fluid region 310 so that the interface is maintained in the shape shown with a broken line in this drawing. In the case of imaging in the imaging modes described in FIGS. 1 and 3, the control section 180 should just control the pressure of the fluid region 310 so that the interface is maintained in the shape shown with a solid line in this drawing.

The control section 180 controls the pressure of the first fluid in the housing 400 by controlling the pressure inside the fluid region 330 that communicates with the fluid region 310. As in the case of the housing 200, the housing 400 has an elastic surface which is in contact with the first fluid inside the fluid region 330. Moreover, the microlens section 150 has a driving section 490 adapted to displace the elastic surface so as to control a volume of the fluid region 330. The driving section 490 may have the same function and operation as the driving section 290. The control section 180 controls the internal pressure of the fluid region 310 by making the driving section 490 displace the elastic surface formed in the housing 400 as in the case of controlling the driving section 290. By making the driving section 490 reduce the volume of the fluid region 330, the control section 180 can control the shape of the interface to be changed from the shape of a broken line to the shape of a solid line in this drawing.

Thus, the control section 180 may control the shapes of a plurality of the microlenses 152 by controlling the shapes of the interfaces. More specifically, the control section 180 can control the shapes of a plurality of the microlenses 152 by controlling the internal pressure of the fluid region 310.

A description is given of the configuration of the light receiving section 160 in this example. The light receiving section 160 has a plurality of color filters 260, a light-shielding section 262, and a plurality of the light receiving elements 162. A plurality of the color filters 260 are provided corresponding to a plurality of the light receiving elements 162. Each of the color filters 260 selectively transmits object light beams of predetermined wavelength bands, among the object light beams that passed through corresponding prism elements 142 and microlenses 152, and makes the corresponding light receiving elements 162 receive the light beams.

In order to prevent interference between adjacent pixels, the light-shielding section 262 has openings that demarcate respective light receiving openings of a plurality of the light receiving elements 162, the openings being formed at the positions corresponding to each of a plurality of the light receiving elements 162. A plurality of the light receiving elements 162 respectively receive light beams that passed through corresponding openings and generate voltage signals that form imaging signals by photoelectric conversion.

Here, in the case of imaging in the imaging mode shown in FIG. 2, the control section 180 controls the shape of a plurality of the microlenses 152 to be the shape having the first refractive power while controlling the interface of the prism elements 142 to be vertical to the optical axis of the lens system 100, and exposes the light receiving section 160. In the case of imaging in the imaging mode shown in FIG. 1, the control section 180 controls the interface of the prism elements 142 to be vertical to the optical axis of the lens system 100 while controlling the shape of a plurality of the microlenses 152 to be the shape having the second refractive power, and exposes the light receiving section 160. In the case of imaging in the imaging mode shown in FIG. 3, the control section 180 controls the shape of a plurality of the microlenses 152 to be the shape having the second refractive power while controlling the prism interface to be inclined with respect to the optical axis of the lens system 100, and exposes the light receiving section 160 in this state. The control section 180 enables images to be taken by switching at least between two imaging modes, out of these three imaging modes.

Figure 5:
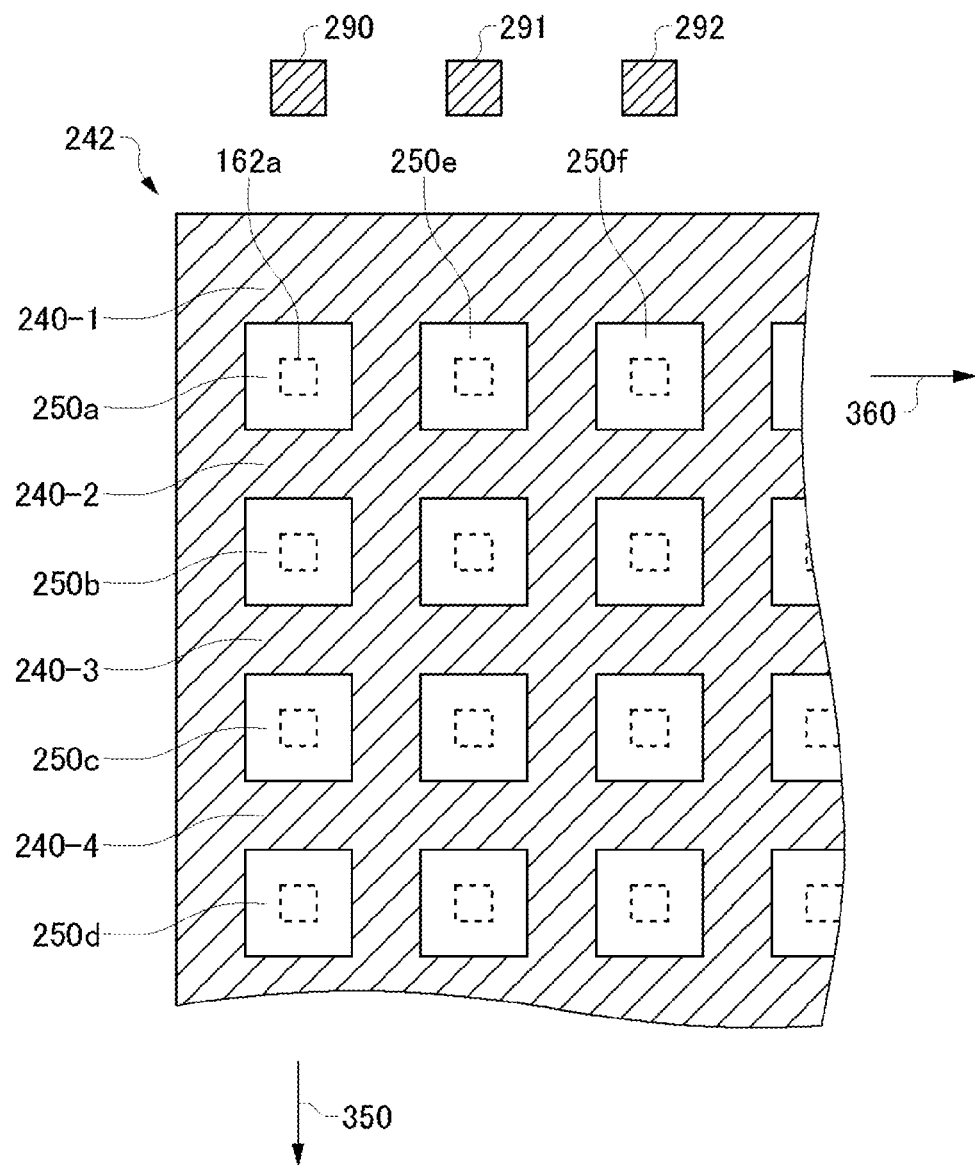
FIG. 5 is a view showing a schematic cross section of the deflection section 140 taken along a plane vertical to an optical axis.

FIG. 5 shows a schematic cross section of the deflection section 140 taken along a plane vertical to the optical axis. This drawing illustrates a cross section AA of FIG. 4. The object light beam is assumed to travel toward the page, in which the positions of the light receiving elements 162 are schematically shown with a broken line for use as a reference. As shown in the drawing, the divider plate 242 has the through holes 250 formed in a matrix form. The light receiving elements 162 are also provided at the positions corresponding to the through holes 250. More specifically, the through holes 250 and a plurality of the light receiving elements 162 are placed in a matrix form. The through holes 250 and the light receiving elements 162 are provided generally at equal intervals in a row direction 350 and in a column direction 360.

More specifically, the divider section 240-1, the divider section 240-2, the divider section 240-3, and the divider section 240-4 are members extending in the column direction 360. Space between these columns is divided by members extending in the row direction 350. As a consequence, a plurality of columns of the through holes arrayed in the row direction 350 are formed in addition to the through holes 250a-250d. For example, columns of the through holes arrayed in the row direction 350 are formed in the row starting with the through hole 250a, in the row starting with the through hole 250e, and in the row starting with the through hole 250f.

As described in reference to FIG. 4, the divider section 240-1 has, on a lateral side, the lateral surface portion with the first thickness along the optical axis direction of the lens system 100. The divider section 240-2 has, on both lateral sides, the lateral surface portion with the second thickness along the optical axis direction of the lens system 100. The divider section 240-3 has, on both the lateral sides, the lateral surface portion with the first thickness along the optical axis direction of the lens system 100. The divider section 240-4 has, on both the lateral sides, the lateral surface portion with the second thickness along the optical axis direction of the lens system 100. In short, the divider plate 242 has the divider sections 240, which have lateral surface portions different in thickness, alternately positioned in the row direction 350. As a consequence, a plurality of prism elements having a first prism angle and a plurality of prism elements having a second prism angle are alternately placed in a plurality of rows.

Thus, the through hole 250 is formed from a first divider section having, on both the lateral sides, a lateral surface portion with the first thickness along the optical axis direction of the lens system 100 and from a second divider section having, on both the lateral sides, a lateral surface portion with the second thickness along the optical axis direction. More specifically, each of the through hole 250 is formed from the lateral surface portion of the first divider section and the lateral surface portion of the second divider section which is adjacent to the first divider section.

Moreover, the through holes 250a-250d communicate via the fluid region 210. While the fluid region 210 may be partitioned into a plurality of regions, the fluid region 210 also needs not be partitioned. When the fluid region 210 is partitioned, a driving section is provided to each of a plurality of the partitioned fluid regions 210, and each of the driving sections controls the pressure of the first fluid inside the corresponding fluid regions 210. In the example of this drawing, a driving section 290, a driving section 291, and a driving section 292 are provided for each row. As a consequence, as compared with the case where the internal pressure of the first fluid region is controlled by one driving section, the prism elements can be controlled promptly. Even in the case where the fluid region 210 is not partitioned into a plurality of regions and all the through holes communicate in the fluid region 210, a plurality of the driving sections may also be provided. That is, the internal pressure of the first fluid region 210 may be controlled by a plurality of driving sections.

It is to be noted that the through holes are formed in a matrix form in the divider plate 442 of the microlens section 150 as in the case of the divider plate 242. The fluid region 310 of the microlens section 150 may also be partitioned into a plurality of regions, and a driving section may be provided corresponding to each of a plurality of the partitioned fluid regions 310 as in the fluid region 210. Even in the case where the fluid region 310 is not partitioned into a plurality of regions and all the through holes communicate in the fluid region 310, a plurality of the driving sections may also be provided. It is to be noted that the fluid region 310 of the microlens section 150 may be partitioned into a plurality of blocks in every row or in every column. The fluid region 310 may also be partitioned into a plurality of blocks including a plurality of rows and/or a plurality of columns. The control section 180 may control so that the microlenses 152 have refractive power different in every block. For example, the control section 180 may control so that the refractive power of the microlenses 152 is smaller in one or more blocks, which pass through a light beam from an unfocused object, than in one or more blocks which pass through a light beam from a focused object. This makes it possible to generate an image which has high-resolution in a focused object region and which has less noise in an unfocused background region.

Figure 6:
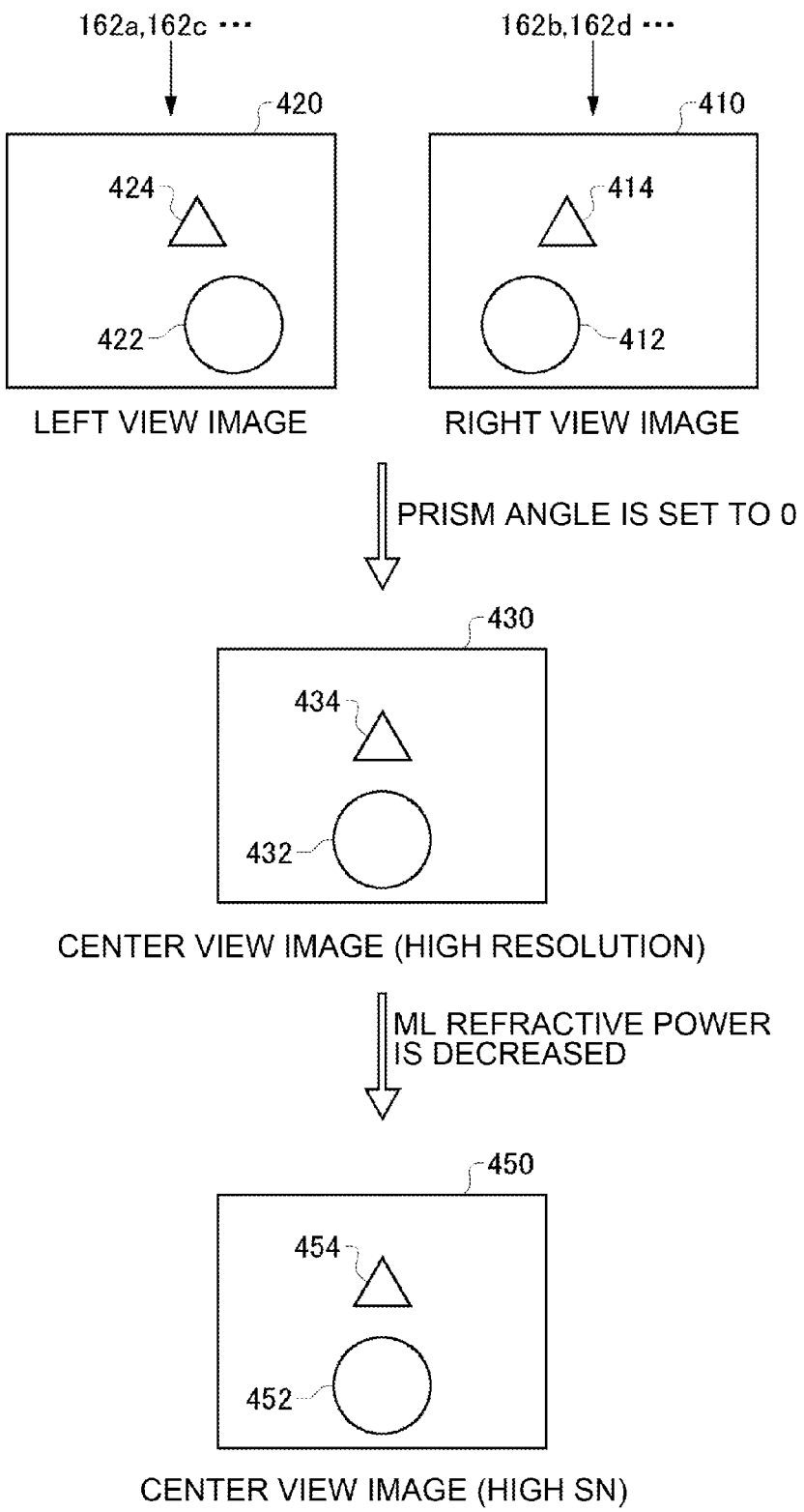
FIG. 6 is a view schematically showing one example of images generated by the imaging apparatus 10.

FIG. 6 shows one example of an image generated by the imaging apparatus 10. The imaging apparatus 10 generates a right view image 410 and a left view image 420 by imaging in the multi-view imaging mode shown in FIG. 3. The right view image 410 includes a long-distance object image 414 which is an image of a long-distance object positioned distant from the imaging apparatus 10 and a short-distance object image 412 which is an image of a short-distance object positioned closer than the long-distance object. The left view image 420 includes a long-distance object image 424 which is an image of a long-distance object and a short-distance object image 422 which is an image of a short-distance object.

The long-distance object image 414 is an image of a long-distance object formed by the light receiving elements 162 that receive a light beam that passed through the right pupil region 122, while the long-distance object image 424 is an image of a long-distance object formed by the light receiving elements 162 that receive a light beam that passed through the left pupil region 124. In the image region, the long-distance object image 414 is formed at a position shifted left from the position where the long-distance object image 424 is formed.

While the short-distance object image 412 is formed at a position shifted left from the long-distance object image 424 like the long-distance object image 414, the short-distance object image 412 is positioned shifted largely from the position of the short-distance object image 422. Accordingly, when the right view image 410 and the left view image 420 are presented to the right eye and the left eye of an observer, an object positioned closer to the imaging apparatus 10 than an object focused by the lens system 100 looks as if it exists far closer to the front side for the observer. As a consequence, the imaging apparatus 10 can provide a stereoscopic image with a sense of distance by the multi-view imaging mode.

When the prism angle of the prism elements 142 is set to 0, the multi-view imaging mode is changed to the high-resolution imaging mode. In the high-resolution imaging mode, an image formed by the luminous flux that passed through the central pupil region 123 is formed, so that an image having in a sense the center as a viewpoint is obtained. Accordingly, when a long-distance object and a distance object are positioned at the center of a right and left direction with respect to the imaging apparatus 10 in real space, their images, a short-distance object image 432 and a long-distance object image 434, are formed at the center in the horizontal direction in a center view image 430.

When the refractive power of the microlenses 152 is decreased to the first refractive power, the multi-view imaging mode is changed to the low noise imaging mode. In low noise imaging mode, like the high-resolution imaging mode, a center view image 450 having in a sense the center as a viewpoint is obtained. In the center view image 450, a short-distance object image 452 and a long-distance object image 454 with suppressed noise can be generated.

Thus, by controlling the optical device 115, the control section 180 can take images by switching the imaging modes. Controlling the pressure makes it possible to change the shapes of the prism elements 142 and the microlenses 152, which are formed from a fluid interface, at very high speed. Accordingly, images can be taken with the imaging modes switched at very high speed.

It is to be noted that the image recording section 190 may record the right view image 410 and the left view image 420 obtained from multi-view images as a stereoscopic image. For example, the image recording section 190 may combine the right view image 410 and the left view image 420 and record them as a stereoscopic image by a parallax barrier system.

It is to be noted that the image recording section 190 may use a short-distance object image included at least in one of the center view image 430 and the center view image 450 to generate a high-definition short-distance object image from a short-distance object image formed at least in one of the right view image 410 and the left view image 420 and may record the high-definition short-distance object image. The image recording section 190 may use a long-distance object image included at least in one of the center view image 430 and the center view image 450 to generate a high-definition long-distance object image from a long-distance object image formed at least in one of the right view image 410 and the left view image 420 and may record the high-definition long-distance object image. Thus, the image recording section 190 may use a specific object image included at least in one of the center view image 430 and the center view image 450 to generate a high-definition specific object image from a specific object image included at least in one of the right view image 410 and the left view image 420 and may record the high-definition specific object image. Even in the case of taking multi-view images under a dark environment, taking multi-view images of an object that is out of focus, and taking images of an object including a high spatial frequency component, the control section 180 takes images by switching to the high-resolution imaging mode or the low noise imaging mode, and synthesizes an object image formed in the obtained center view image 450 or center view image 430 with the right view image 410 and the left view image 420, so that a high definition object image can be generated from an object image formed in the right view image 410 and the left view image 420 and be recorded. Accordingly, the imaging apparatus 10 can provide high definition multi-view images.

Figure 7:
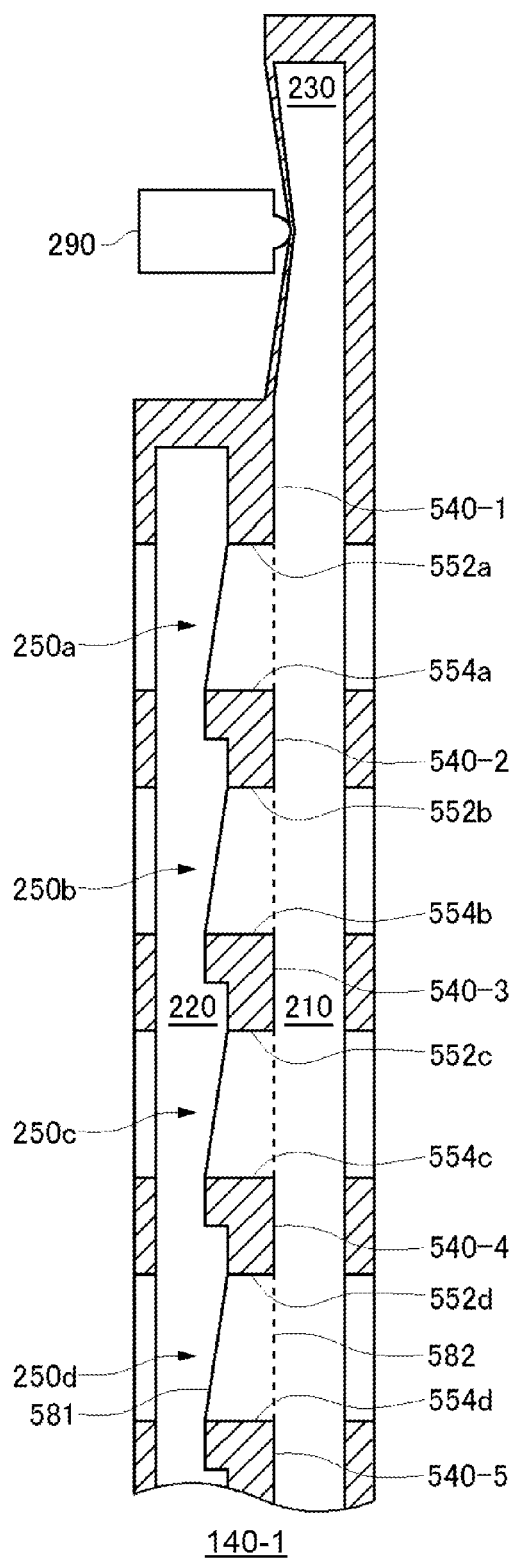
FIG. 7 is a view schematically showing another example of the configuration of the deflection section 140.

FIG. 7 schematically shows another example of the configuration of the deflection section 140. With the deflection section 140 shown in FIG. 4, the right view image and the left view image can be taken in the first state where the through holes 250 are filled with the first fluid, and the center view image can be taken in the second state where the through holes 250 are filled with the second fluid. A deflection section 140-1 shown in this drawing is different from the deflection section 140 shown in FIG. 4 in the point of having a configuration of taking a left view image in the first state. More specifically, the shape of the through holes 250 formed in the divider plate 242 is different from that in the deflection section 140 shown in FIG. 4. Accordingly, the difference is mainly described herein.

The through holes 250a-250d are formed from lateral surface portions included in the divider section 540 which are different in thickness. More specifically, the through hole 250a is formed from a lateral surface portion 552a with a first thickness included in a divider section 540-1, and a lateral surface portion 554a with a second thickness included in a divider section 540-2. The through holes 250b-250d are similarly formed from a lateral surface portion with the first thickness and a lateral surface portion with the second thickness respectively included in the divider sections 540-2 to 540-5.

Lateral surfaces of the divider sections 540-1 to 540-5 on the first fluid side are positioned generally on the same plane as in the case of the divider sections 240-1 to 240-5 shown in FIG. 2. In short, the divider plate 242 has a planate end face on the first fluid side.

When the pressure of the first fluid is controlled so that the first fluid and the second fluid are balanced in the state where the through holes 250 are filled with the first fluid, an interface shown with a solid line, like the prism element 581, is formed. More specifically, the prism elements 142 with the same prism angles are formed in the through holes 250. This prism angles are the same as the prism angles formed in the through holes 250a and 250c in the example of FIG. 4. Therefore, in the state where the through holes 250 are filled with the first fluid, light beams that can be received by the light receiving elements 162 are limited to those that passed through the left pupil region 124. In this state, a left view image can be taken with the light receiving elements 162 included in the light receiving section 160. Accordingly, it becomes possible to provide high-resolution left view images taken at the same timing by effective use of the light receiving elements 162 included in the light receiving section 160.

Where the fluids are balanced in the state where the through holes 250 are filled with the second fluid, an interface like the prism element 582 which is the same as the interface shown with a broken line in FIG. 4 is formed. Accordingly, a center view image can be taken by the light receiving elements 162 included in the light receiving section 160. When the center view image is taken, controlling the magnitude of the refractive power of the microlenses 152 as described above makes it possible to select between the mode for taking high-resolution center view images and the mode for taking low noise center view images.

Figure 8:
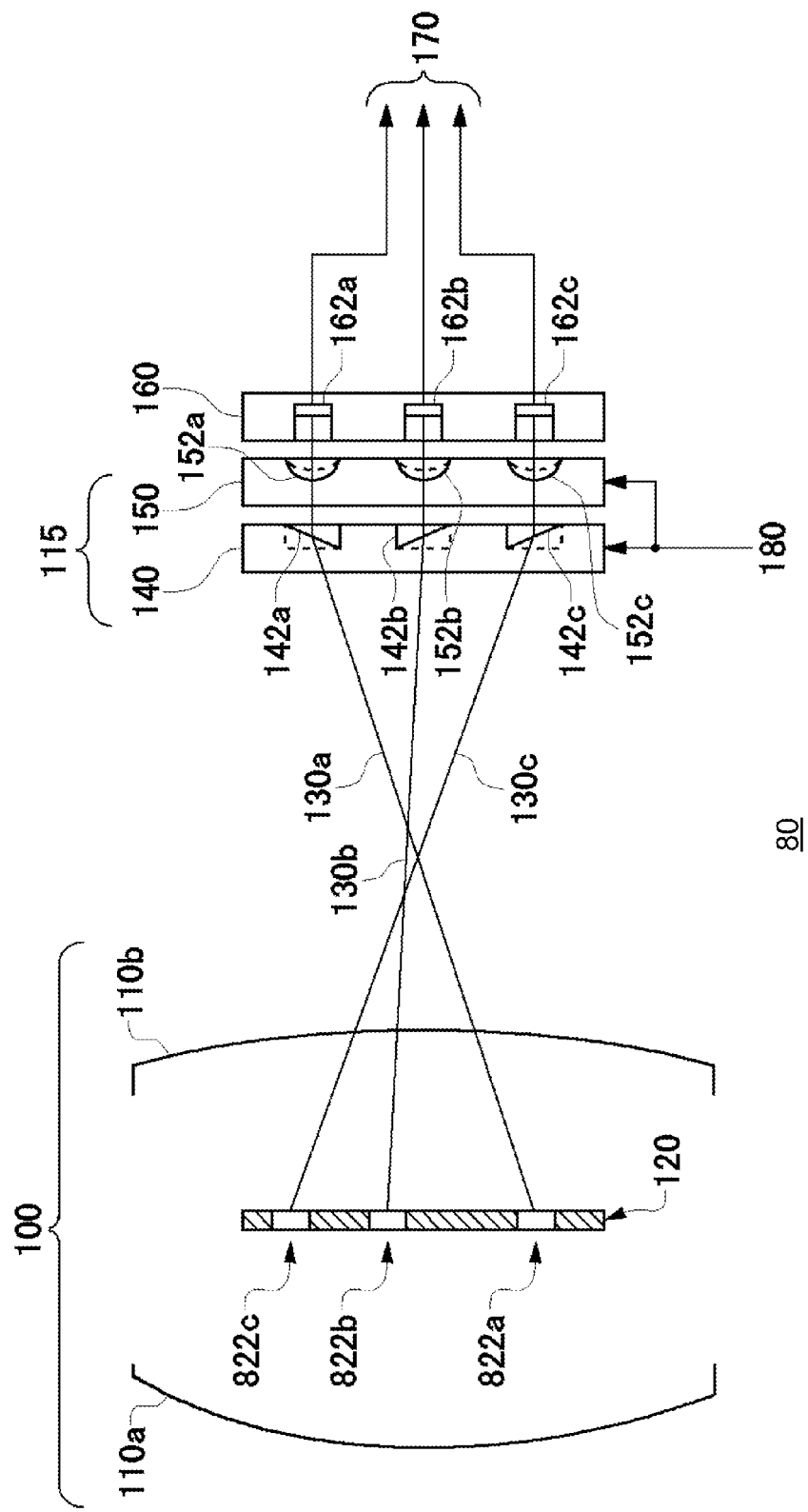
FIG. 8 is a view schematically showing one example of a block configuration of an imaging apparatus 80.

FIG. 8 schematically shows one example of a block configuration of an imaging apparatus 80. According to the imaging apparatus 80, an imaging apparatus which has an effectually deep depth of field can be provided. The imaging apparatus 80 includes a lens system 100, an optical device 115, and a light receiving section 160. Although the imaging apparatus 80 has a functional block which functions and operates in the same way as in the image signal generation section 170, the control section 180, and the image recording section 190 described in the foregoing, illustration of the functional block itself is omitted and instead, a connection relation with other functional blocks is illustrated.

The imaging apparatus 80 is different from the above-described imaging apparatus 10 particularly in image formation characteristics of the lens system 100 and in internal configuration of the optical device 115. A description is given of the difference in function or operation from the imaging apparatus 10. The lens system 100 is a lens having focal lengths different in every region. For example, the lens system 100 may have a lens system 100*a* that is a progressive refraction lens. In this drawing, an object-side optical surface of the lens 110*a* provides focal lengths different in every region for easy understanding of the difference in focal length. It suffices to configure the lens system 100 so that optical paths that impart different focal lengths are provided by the lens system as a whole, and therefore it is not necessary to provide the difference in focal length by a specific optical surface of a specific lens.

The imaging apparatus 80 has an increased depth imaging mode which is an imaging mode for providing an effectually deep depth of field. The shapes of the prism elements 142 and the microlenses 152 in the case of imaging in the increased depth imaging mode are shown with a solid line in this drawing. In the increased depth imaging mode, the control section 180 controls the microlenses 152 in the shape having the second refractive power. The control section 180 also provides the prism elements 142 with prism angles which make separate light receiving elements 162 receive light beams that passed through two or more pupil regions in the exit pupil 120 of the lens system 100.

More specifically, the prism element 142*a* has a prism angle for making the light receiving element 162*a* receive an object light beam 130*a* that passed through a pupil region 822*a*. The prism element 142*b* has a prism angle for making the light receiving element 162*b* receive an object light beam 130*b* that passed through a pupil region 822*b*. The prism element 142*c* has a prism angle for making the light receiving element 162*c* receive an object light beam 130*c* that passed through a pupil region 822*c*. The object light beam 130*a* which passes through the pupil region 822*b* and comes incident into the light receiving element 162*a*, the object light beam 130*b* which passes through the pupil region 822*b* and comes incident into light receiving element 162*b*, and the object light beam 130*c* which passes through the pupil region 822*c* and comes incident into the light receiving element 162*c* are to pass through optical surfaces of the lens 110*a* which are different from each other. Accordingly, the light receiving section 160 can take images of the same object with respective light beams that passed through the regions of the lens system 100 which are different in focal length.

Here, it is assumed that that an object light beam 130, which passed through a region of the lens system 100 having the first focal length, passes through the pupil region 822*a*. It is also assumed that an object light beam 130, which passed through a region of the lens system 100 having the second focal length, passes through the pupil region 822*b*, and an object light beam 130, which passed through a region of the lens system 100 having the third focal length, passes through the pupil region 822*c*.

The image signal generation section 170 generates signals of an image corresponding to the first focal length based on imaging signals from a part of the light receiving elements 162, like the light receiving element 162*a*, which receive a light beam that passed through the pupil region 822*a*. The image signal generation section 170 also generates image signals of an image corresponding to the second focal length based on imaging signals from a part of the light receiving elements 162, like the light receiving element 162*b*, which receive a light beam that passed through the pupil region 822*b*. The image signal generation section 170 also generates image signals of an image corresponding to the third focal length based on imaging signals from a part of the light receiving elements 162, like the light receiving element 162*c*, which receive a light beam that passed through the pupil region 822*b*.

The image signal generation section 170 may generate one image by combining the generated images with different focal lengths. The image recording section 190 records the images generated in the image signal generation section 170. The imaging apparatus 80 can provide a clear image of an object which positions inside the depth of field of the lens elements that correspond to any one of the pupil regions 822*a*-822*c*. Accordingly, the imaging apparatus 80 can have an effectually deep depth of field.

In the increased depth imaging mode of this example, the light receiving elements 162 are made to selectively receive a light beam that passed through a specific pupil region out of the three pupil regions. The number of partitions of the exit pupil 120 is not limited to three but may be any number as long as it is two or more. Thus, in the case of imaging an object with different focal lengths, the control section 180 controls the shape of a plurality of the microlenses 152 to be in the shape having the second refractive power while controlling the prism interface of the deflection section 140 to be inclined with respect to the optical axis of the lens system 100. The image signal generation section 170 then generates image signals of an image with the first focal length and an image with the second focal length based on imaging signals of a plurality of the first light receiving elements and imaging signals of a plurality of the second light receiving elements.

It is to be noted that the imaging apparatus 80 has an imaging mode corresponding to the high-resolution imaging mode stated with reference to FIGS. 1 through 7 besides the increased depth imaging mode. The prism angle of the prism elements 142 in this imaging mode is shown with a broken line in this drawing. In this imaging mode, the optical device 115 has just to be controlled in the same way as in the high-resolution imaging mode stated with reference to FIGS. 1 through 7, and so the description thereof is omitted herein.

Figure 9:
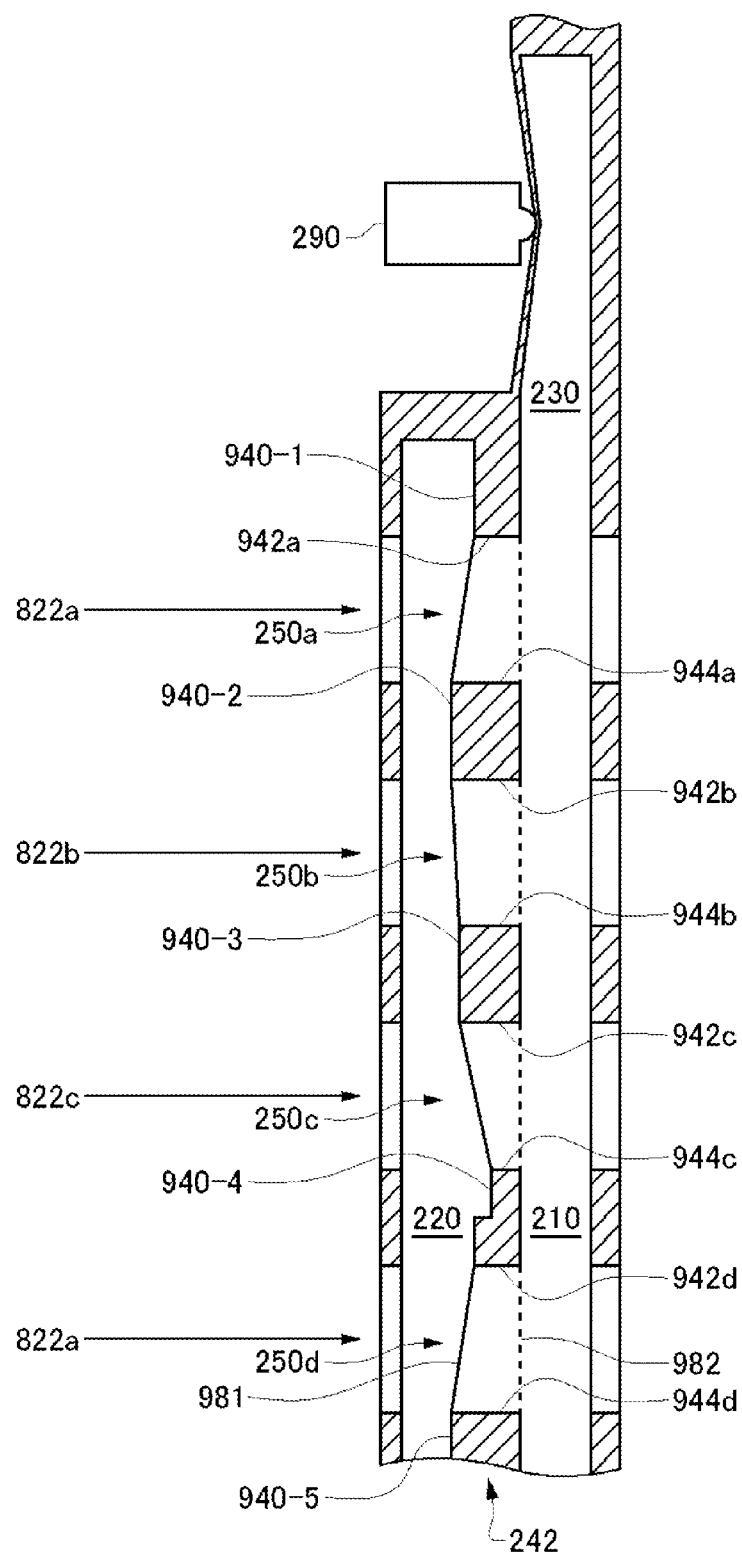
FIG. 9 is a view schematically showing one example of a configuration of the deflection section 140 in the imaging apparatus 80.

FIG. 9 schematically shows one example of the configuration of the deflection section 140 in the imaging apparatus 80. This example is one example of a configuration for implementing two imaging modes described in reference to FIG. 1. As described with reference to FIG. 4 and other drawings, a plurality of the prism elements 142 included in the deflection section 140 in this example are fluid prism elements formed from an interface between the first fluid and the second fluid. Component members whose configuration is identical to those described in FIG. 4 are designated with reference numerals identical to those of FIG. 4, and a description thereof is omitted except for their difference.

With the deflection section 140 shown in FIG. 4, images can be taken by switching the prism interface between the first state where the right view image and the left view image can be taken and the second state where the center view image can be taken. More specifically, according to the configuration of the deflection section 140 shown in FIG. 4, images of two viewpoints can simultaneously be taken in the first state. The deflection section 140 in this example is different from the deflection section 140 shown in FIG. 4 in the point of having a configuration of simultaneously taking images of three viewpoints in the first state. A surface shape of the divider plate 242 on the second fluid side in particular is different from that of the divider plate 242 shown in FIG. 4. A description is herein given with a focus on a difference from the divider plate 242 shown in FIG. 4.

A divider section 940-1 and a divider section 940-2 correspond to the divider section 240-1 and the divider section 240-2 in the divider plate 242 shown in FIG. 4. More specifically, a lateral surface portion 942a of the divider section 940-1 has a first thickness, and a lateral surface portion 944a of the divider section 940-2 has a second thickness. A through hole 250a in this drawing is assumed to be a through hole having the same shape as the through hole 250a shown in FIG. 4.

In the divider plate 242 of this example, a through hole 250b is formed from a lateral surface portion 942b having the second thickness and a lateral surface portion 944b having a third thickness. The third thickness is assumed to be larger than the first thickness and smaller than the second thickness. The lateral surface portion 942b and the lateral surface portion 944b are provided respectively by the divider section 940-2 and a divider section 940-3.

In the divider plate 242 of this example, a through hole 250c is formed from a lateral surface portion 942c having the third thickness and a lateral surface portion 944c having a fourth thickness. The fourth thickness is assumed to be smaller than the first thickness. The lateral surface portion 942c and the lateral surface portion 944c are provided respectively by the divider section 940-3 and a divider section 940-4. Here, a difference in thickness between the second thickness and the third thickness is assumed to be different from a difference in thickness between the third thickness and the fourth thickness. This makes it possible to differentiate the prism angles formed by the divider section 240b and by the divider section 240c.

The through hole 250d has the same shape as the through hole 250a. The through hole 250d is formed from a lateral surface portion 942d having the first thickness and a lateral surface portion 944d having the second thickness. The lateral surface portion 942d and the lateral surface portion 944d are respectively provided by the divider section 940-4 and the divider section 940-5. The divider section 940-4 has a lateral surface portion 942c with the second thickness on one side and a lateral surface portion 944d with the first thickness on the other side.

In the first state, an interface like a prism element 981 is formed as shown with a solid line. The prism elements formed in the through hole 250a, the through hole 250b, and the through hole 250c have prism angles different from each other. More specifically, the prism element 142a formed in the through hole 250a has a prism angle for making the light receiving element 162a receive an object light beam that passed through the pupil region 822a. The prism element 142 formed in the through hole 250b has a prism angle for making the light receiving element 162b receive a light beam that passed through the pupil region 822b. Moreover, the prism element 142 formed in the through hole 250c has a prism angle for making the light receiving element 162c receive a light beam that passed through the pupil region 822a. Therefore, it becomes possible to limit light beams received by the corresponding light receiving elements 162a-162c to those passing the pupil regions of the exit pupil 120 which are different from each other.

In the second state, an interface like a prism element 982 is formed as shown with a broken line vertical to the optical axis. Therefore, the imaging apparatus 80 can take images in the high-resolution imaging mode with the prism elements 142 formed from the interface.

Figure 10:
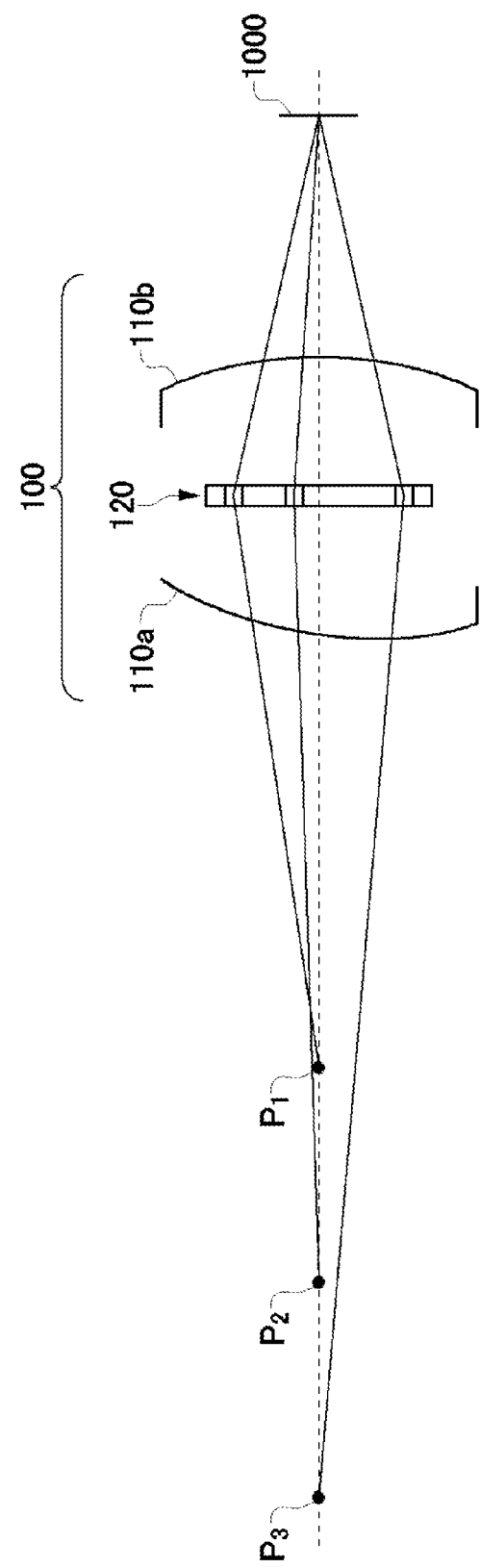
FIG. 10 is a view schematically showing an image formation relation between the light receiving section 160 and an object.

FIG. 10 schematically shows an image formation relation between the light receiving section 160 and an object. Reference characters P1, P2, and P3 respectively designate positions of a short-distance object, a middle-distance object, and a long-distance object. The light beam from the position P3 passes through a third optical surface and a pupil region 822a of the lens 110a which provide a long focal length, and forms an image on an image surface 1000 that is a position of the light receiving sections 160. The light beam from the position P2 passes through a second optical surface and a pupil region 822b of the lens 110a which provide a middle focal length and forms an image on the image surface 1000. The light beam from the position P1 passes through a first optical surface and a pupil region 822c of the lens 110a which provide a short focal length and forms an image on the image surface 1000.

Accordingly, the imaging apparatus 80 can generate a focus image of an object which is positioned within any one of: a depth of field of the lens system 100 with respect to the luminous flux passing through the pupil region 822a; a depth of field of the lens system 100 with respect to the luminous flux passing through the pupil region 822b; and a depth of field of the lens system 100 with respect to the luminous flux passing through the pupil region 822c. When a front end of the depth of field of the lens system 100 with respect to the luminous flux passing through the pupil region 822b is present closer to the imaging apparatus 80 side than a rear end of the depth of field of the lens system 100 with respect to the luminous flux passing through the pupil region 822c, and the front end of the depth of field of the lens system 100 with respect to the luminous flux passing through the pupil region 822a is present closer to the imaging apparatus 80 side than the rear end of the depth of field of the lens system 100 with respect to the luminous flux passing through the pupil region 822b, the imaging apparatus 80 can generate a focus image of an object that is present in the range between the front end of the depth of field with respect to the position P1 and the rear end of the depth of field with respect to the position P3. Therefore, according to the lens system 100 and the optical device 115, an effectual depth of field can be expanded.

Figure 11:
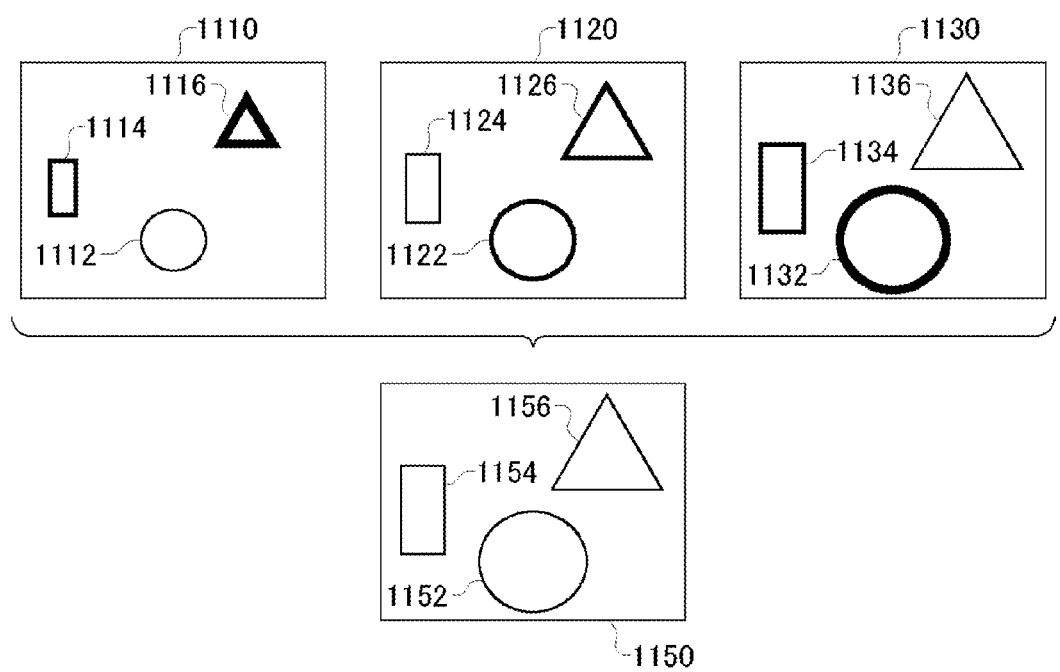
FIG. 11 is a view schematically showing one example of processing to generate a synthesized image 1150.

FIG. 11 schematically shows one example of the processing that generates a synthesized image 1150 with an expanded depth of field. A short focus image 1110, a middle focus image 1120, and a long focus image 1130, which are one example of the images with different focal lengths generated by the image signal generation section 170, are images formed by light beams that passed through the first optical surface for a short focal length, the second optical surface for a middle focal length, and the third optical surface for a long focal length, respectively.

The short focus image 1110 includes a short-distance object image 1112 that is an image of a short-distance object present at the position P1 having a short distance from the imaging apparatus 80, a middle-distance object image 1114 that is an image of a middle-distance object present at the position P2 having a middle distance from the imaging apparatus 80, and a long-distance object image 1116 that is an image of a long-distance object present at the position P3 having a long distance from the imaging apparatus 80. The first optical surface for the short focal length can image an object light beam from the short-distance position P1 on the light receiving section 160. Accordingly, the short-distance object image 1112 is the clearest image among the short-distance object image 1112, the middle-distance object image 1114, and the long-distance object image 1116.

The middle focus image 1120 includes a short-distance object image 1122 that is an image of a short-distance object, a middle-distance object image 1124 that is an image of a middle-distance object, and a long-distance object image 1126 that is an image of a long-distance object. The second optical surface for the middle focal length can image an object light beam from the middle-distance position P2 on the light receiving section 160. Accordingly, the middle-distance object image 1124 is the clearest image among the short-distance object image 1122, the middle-distance object image 1124, and the long-distance object image 1126.

The long focus image 1130 includes a short-distance object image 1132 that is an image of a short-distance object, a middle-distance object image 1134 that is an image of a middle-distance object, and a long-distance object image 1136 that is an image of a long-distance object. The third optical surface for the long focal length can image an object light beam from the long-distance position P3 on the light receiving section 160. Accordingly, the long-distance object image 1136 is the clearest image among the short-distance object image 1132, the middle-distance object image 1134, and the long-distance object image 1136. It is to be noted that clearness of object images was expressed by thinness of lines in this drawing.

The image signal generation section 170 generates the synthesized image 1150 by using the short-distance object image 1112, the middle-distance object image 1124, and the long-distance object image 1136. As a result, it becomes possible to generate the synthesized image 1150 that includes the short-distance object image 1152, the middle-distance object image 1154, and the long-distance object image 1156, each of which is a clear image. It is to be noted that the long focus image 1130 formed through the third optical surface that is for the longest focal length is the highest magnification image among the short focus image 1110, the middle focus image 1120, and the long focus image 1130. The image signal generation section 170 corrects the magnification of each object image corresponding to the focal length of each optical surface before synthesis. The image signal generation section 170 may correct the magnification of the short-distance object image 1112 and the middle-distance object image 1124 according to the magnification of the long focus image 1130, and may synthesize them with the long focus image 1130.

It is to be noted that images by light beams that passed through different pupil surfaces are formed at the positions shifted corresponding to their focus states and object distances as described in reference to FIG. 6. For easy understanding, respective object images in the short focus image 1110, the middle focus image 1120, and the long focus image 1130 are shown without their shifts being emphasized. The image signal generation section 170 may generate a synthesized image 1150 in which object images respectively corresponding to a position of the most focused short-distance object image 1112, a position of the most focused middle-distance object image 1124, and a position of the most focused long-distance object image 1136 are positioned. As a consequence, the image signal generation section 170 can generate the synthesized image 1150 with an influence of displaced viewpoint and focus being reduced.

Figure 12:
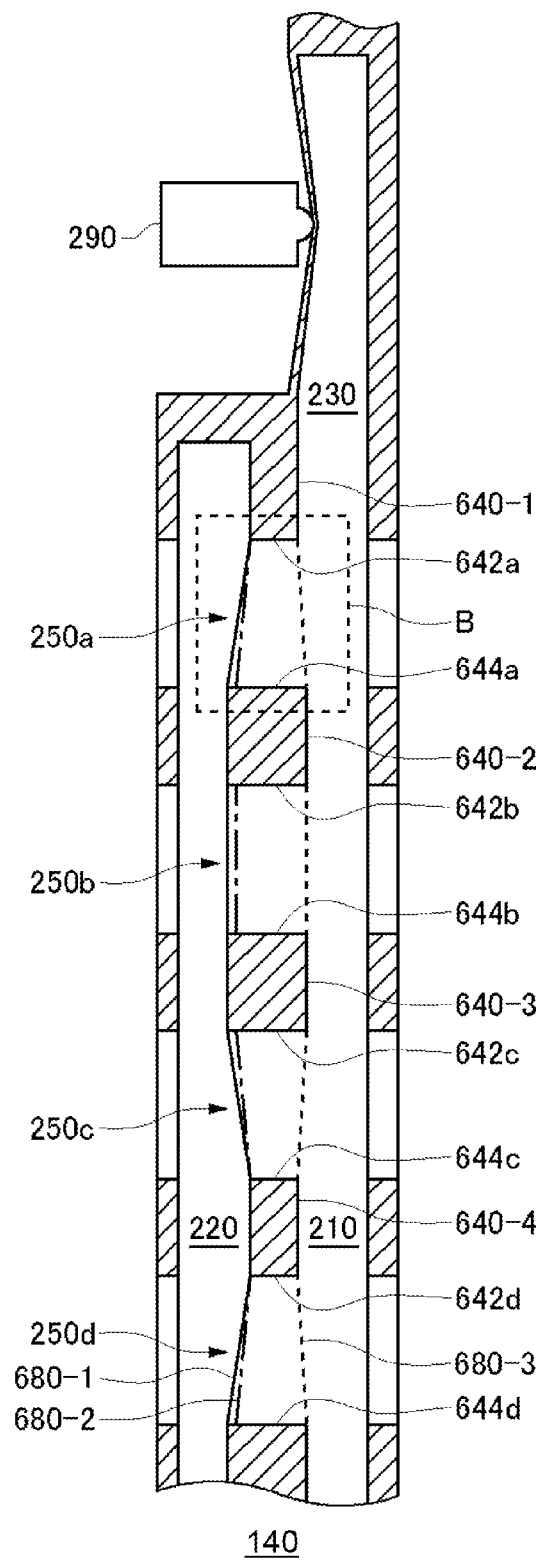
FIG. 12 is a view schematically showing another example of the configuration of the deflection section 140.

FIG. 12 is a view schematically showing another example of the configuration of the deflection section 140. The deflection section 140 shown in FIG. 9 is capable of taking images with the luminous flux that passes through three different pupil regions in the exit pupil 120 in the first state, and is capable of taking images with the luminous flux that passes through one pupil region in the exit pupil 120 in the second state. The deflection section 140 of this example is configured to have three states as the state of the fluid interfaces and to be able to take images, in each of these states, with the luminous flux passing through three different pupil regions. Particularly, the surface shapes of the divider plate 242 on the first fluid side and the second fluid side and the configuration of the lateral surface portions forming the through hole 250 are different from those of the divider plate 242 shown in FIG. 9. A description is herein given with a focus on the difference.

The through hole 250a of this example is formed from a lateral surface portion 642a with the first thickness included in a divider section 640-1, and a lateral surface portion 644a with a fourth thickness included in a divider section 640-2. The fourth thickness is assumed to be larger than the second thickness. In the through hole 250a of this example, an interface formed by connecting endpoints of both the lateral surface portions on the second fluid side has the same prism angle as the interface of the through hole 250a formed on the second fluid side shown in FIG. 9. Therefore, the prism element formed from this interface limits the light beams to be received by the light receiving element 162a to those that passed through the pupil region 822a. As shown with a broken line in this drawing, an interface formed by connecting endpoints of both the lateral surface portions on the first fluid side in the through hole 250a of this example has a prism angle inclined from a plane vertical to the optical axis. The prism element 142a having this prism angle limits the light beams to be received by the light receiving element 162a to those that passed through a pupil region in the exit pupil 120 that is between the center of the optical axis and the pupil region 822c.

The through hole 250b of this example is formed from a lateral surface portion 642b with the fourth thickness included in a divider section 640-2, and a lateral surface portion 644b with a fourth thickness included in a divider section 640-3. The divider section 640-2 and the divider section 640-3 position at the same position in the optical axis direction. Accordingly, an interface vertical to the optical axis is formed on both the endpoint on the second fluid side and the endpoint on the first fluid side. Therefore, the interface formed in the through hole 250b limits the light beams to be received by the light receiving section 160b to those that passed through the region in the vicinity of the optical axis in the exit pupil 120.

The through hole 250c of this example is formed from a lateral surface portion 642c with the fourth thickness included in the divider section 640-3, and a lateral surface portion 644b with the first thickness included in a divider section 640-4. In the through hole 250c of this example, an interface formed by connecting endpoints of both the lateral surface portions on the second fluid side has the same prism angle as the interface of the through hole 250c formed on the second fluid side shown in FIG. 9. Therefore, the prism element formed from this interface limits the light beams to be received by the light receiving element 162c to those that passed through the pupil region 822c. As shown with a broken line in this drawing, in the through hole 250c of this example, an interface formed by connecting endpoints of both the lateral surface portions on the first fluid side has a prism angle inclined from the plane vertical to the optical axis. The prism element 142c having this prism angle limits the light beams to be received by the light receiving element 162c to those that passed through a pupil region in the exit pupil 120 that is between the center of the optical axis and the pupil region 822a.

The through hole 250d is formed from a lateral surface portion 642d with the first thickness included in the divider section 640-3, and a lateral surface portion 644d with the fourth thickness included in a divider section 640-5. The divider section 640-5 is the same member as the divider section 640-2. Accordingly, the prism element formed in the through hole 250d is similar to the prism element formed in the through hole 250a.

Moreover, according to the divider plate 242 of this example, a prism element shown with a dashed dotted line in this drawing, such as a prism element 680-2, is formed. The prism element shown with a dashed dotted line has a prism angle whose inclination is smaller than that of the prism angle shown with a solid line as in a prism element 680-1 and is larger than that of the prism angle shown with a broken line as in a prism element 680-3. A configuration for stably retaining the prism elements shown with a dashed dotted line in this drawing is described in reference to FIG. 13.

According to the deflection section 140 of this example, the fluid interface can be controlled in three states as shown with a solid line, a dashed dotted line, and a broken line in this drawing. This makes it possible to take images with different combinations of prism angles. The depth of fields obtained in three interface states is described in reference to FIG. 14.

Figure 13:
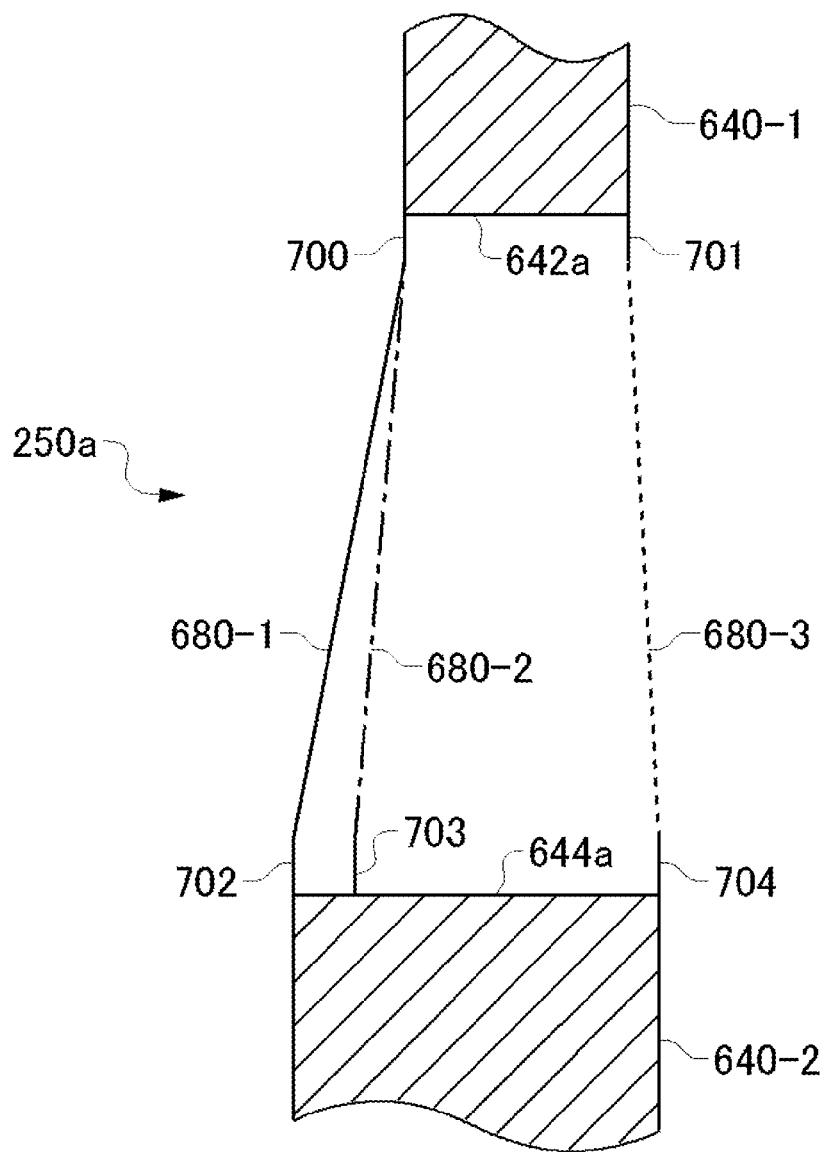
FIG. 13 is a view showing a modified example of a divider plate 242.

FIG. 13 shows a modified example of the divider plate 242. The modified example of the divider plate 242 is described by taking up the divider plate 242 shown in FIG. 12, and a part B in FIG. 12 in particular.

There are formed in the lateral surface portion 642a a protruding portion 700 and a protruding portion 701 which protrude toward the inside of the through hole 250a. There are formed in the lateral surface portion 644a a protruding portion 702, a protruding portion 703, and a protruding portion 704 which protrude toward the inside of the through hole 250a. All the protruding portions have a thickness large enough to trap the fluid interface. The protruding portion 703 is positioned closer to the fluid region 220 than the protruding portion 700 in the optical axis direction.

In the first state, an interface is formed between a top end of the protruding portion 700 that is an end portion on the fluid region 220 side and a top end of the protruding portion 702 that is an end portion on the fluid region 220 side, and this serves as the prism element 680-1. In the second state, an interface is formed between a top end of the protruding portion 701 that is an end portion on the fluid region 210 side, and a top end of the protruding portion 704 that is an end portion on the fluid region 210 side, and this serves as the prism element 680-3. In the third state, an interface is formed between the top end of the protruding portion 700 that is an end portion on the fluid region 220 side and a top end of the protruding portion 703 of the lateral surface portion 644a, and this serves as the prism element 680-2.

According to the present example, the lateral surface portion 642a and the lateral surface portion 644a have protruding portions, so that the fluid interface is easily trapped by the top ends of these protruding portions. This makes it possible to stably control the prism angles.

In this example, the part B in FIG. 12 was taken up and the protruding portions formed in the through hole 250a was described. It should naturally be understood that the protruding portions may be formed at intended positions in all the through holes 250 that are included in the divider plate 242 so as to trap the interface and the protruding portions may also be formed at intended positions in any example of the through holes 250 of the divider plate 242 described with reference to FIGS. 1 through 11 so as to trap the interface.

Figure 14:
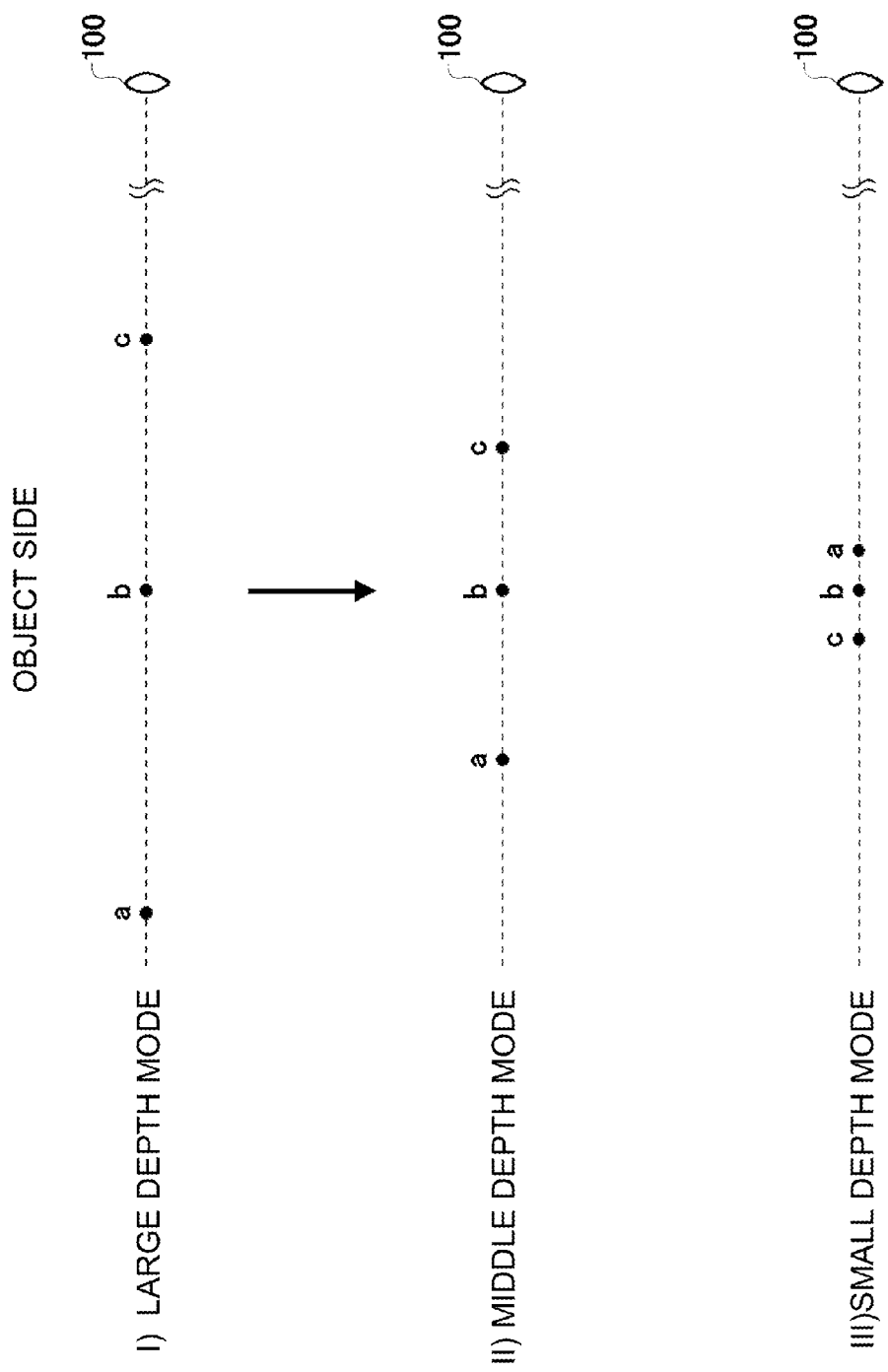
FIG. 14 is a view schematically showing one example of object positions which enable image formation.

FIG. 14 schematically shows one example of object positions which enable image formation in each of three states of the prism elements 142. Focal lengths of the luminous flux that the light receiving elements 162 can receive are determined by the interfaces formed in the through hole 250a, the through hole 250b, and the through hole 250c, and object positions that enable image formation on the light receiving section 160 are determined thereby. Accordingly, in this drawing, the object positions that enable image formation are denoted with suffixes added to the reference characters of the through holes 250.

The imaging apparatus 80 uses, as imaging modes different in depth of field, three states of the prism elements 142 described in reference to FIGS. 12 and 13. More specifically, they are used as a large depth mode, a middle depth mode, and a small depth mode. As stated in reference to FIG. 12, according to the interface formed in the through hole 250b, an object image is formed in all the states by the luminous flux that passed through a pupil region around the optical axis. Therefore, in the interface formed in the through hole 250b, an object position that enables image formation is constant in any of the modes.

The large depth mode corresponds to the state where the interfaces shown with a solid line in FIG. 12 are formed. The interfaces formed in the through hole 250a and the through hole 250c have a prism angle whose inclination is relatively large. Therefore, according to the prism element formed in the through hole 250a, an object light beam from a relatively distant object position a is imaged on the light receiving section 160. Moreover, according to the prism element formed in the through hole 250c, an object light beam from a relatively close object position c is imaged on the light receiving section 160.

The middle depth mode corresponds to the state where the interfaces shown with a dashed dotted line in FIG. 12 are formed. The interfaces formed in the through hole 250a and the through hole 250c form a prism whose inclination is smaller than that of the large depth mode. Therefore, the object position a is positioned closer to the imaging apparatus 80 than the object position a in the large depth mode. Moreover, an object position c is positioned more distant than the object position c in the large depth mode.

The small depth mode corresponds to the state where the interfaces shown with a dotted line in FIG. 12 are formed. The interfaces formed in the through hole 250a and the through hole 250c form a prism whose inclination is inverted and is further smaller than that of the middle depth mode. Therefore, the object position c is positioned closer to the imaging apparatus 80 than the object position a in the middle depth mode. Moreover, an object position a is positioned more distant than the object position c in the large depth mode.

Accordingly, when objects are present in a relatively large distance range, the imaging apparatus 80 takes images in the large depth mode and performs synthesizing processing shown in FIG. 11, so that a clear object image can be acquired. Contrary to this, when objects are concentrated in a small distance range, the imaging apparatus 80 takes images in the small depth mode and performs synthesizing processing shown in FIG. 11, so that a clear object image can be acquired. When objects are present in a certain distance range, the imaging apparatus 80 takes images in the middle depth mode and performs synthesizing processing shown in FIG. 11, so that a clear object image can be acquired. Thus, the imaging apparatus 80 can select any one of the imaging modes based on a distance to an object which needs to be resolved. The imaging apparatus 80 may select any one of the imaging modes based on an instruction from a user of the imaging apparatus 80, and may select any one of the imaging modes based on distance-measurement information on the object.

The imaging apparatus 80 may also take images a plurality of times by switching a plurality of the modes out of the large depth mode, the middle depth mode, and the small depth mode. The imaging apparatus 10 may select most focused object images, out of a plurality of images obtained by switching the modes, and may synthesize them as shown in FIG. 11. This makes it possible to provide object images focused by minute distance resolution.

Figure 15:
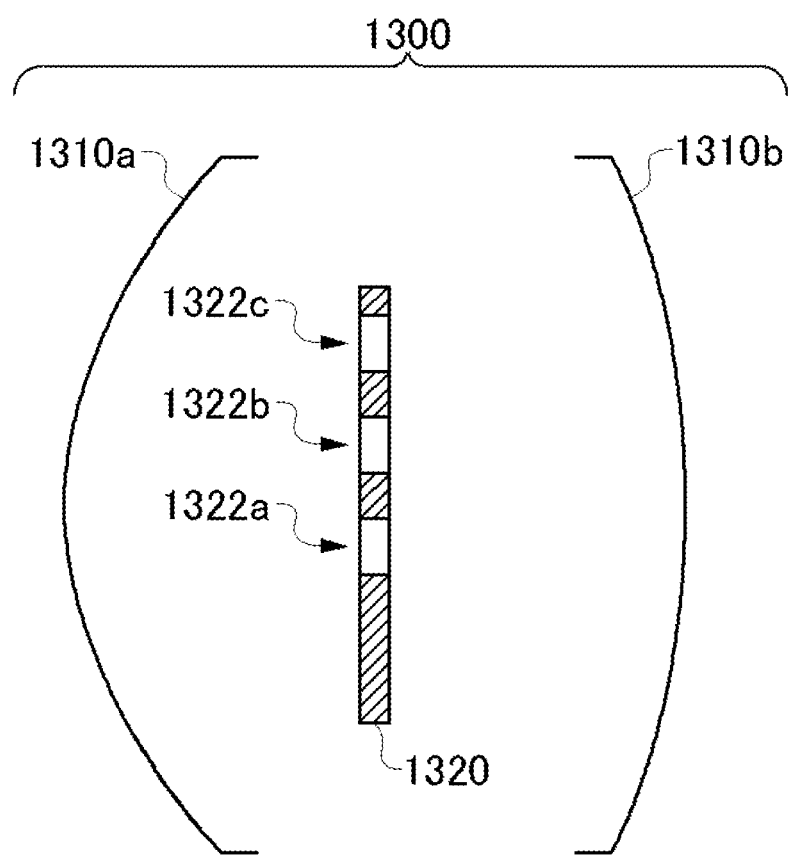
FIG. 15 is a view schematically showing another example of a lens system.

FIG. 15 is a view schematically showing another example of the lens system. This example shows another example of the lens system 100 described in reference to FIGS. 8 through 14. A lens 110a included in the lens system 100 is structured as a progressive refraction lens in one example. A lens 1310a included in a lens system 1300 of this example provides focal lengths different corresponding to a distance from the optical axis but is equal on optical surfaces which are at an equal distance from the optical axis. The lens system 1300 has refractive power which is in a sense concentrically distributed. The lens system 1300 of this example has a short focal length at the center of the optical axis and has a longer focal length as going farther from the optical axis.

In the lens system 1300 of this example, object light beams to be received by the light receiving elements 162 are limited to those that passed through any one of pupil regions of the partial pupil regions 1322a-1322c in an exit pupil 1320 of the lens system 1300, the pupil regions being positioned at different distances from the optical axis. More specifically, the prism angles of the prism elements 142a-142c included in the deflection section 140 are controlled to be the angles which respectively make the corresponding light receiving elements 162 receive the light beams from the respective partial pupil regions 1322a-1322c. Since the configuration and specific control details of the deflection section 140 for controlling the prism angles of the prism elements 142 are similar to the configuration and specific details described in reference to FIGS. 8 through 14, a description thereof is omitted.

An effectual depth of field can be increased also with the lens system 1300 of this example as described in reference to FIGS. 1 through 14. Moreover, in FIGS. 1 through 15, a description has been given by taking up the lens system whose focal length is continuously varied, though a lens system whose focal length is discontinuously varied may be employed as a lens system of the imaging apparatus 80. It suffices that the microlenses 152 included in the microlens section 150 can limit the width of the pupil to such an extent that a difference in focal length is negligible. Therefore, the control section 180 may control the refractive power of the microlenses 152 so as to limit the width of the pupil to such an extent that a difference in focal length is negligible. The control section 180 may control the refractive power of the microlenses 152 depending on the prism angles of the corresponding prism elements 142 so that the width of the pupil is limited to be different according to every focal length.

Although the present invention has been described with use of embodiments, the technical scope of the present invention is not limited to the range described in the embodiments. It is apparent for those skilled in the art that various arrangements or modifications can be applied to the disclosed embodiments. It is clear from the description of the claims that configurations incorporating such arrangements and modifications shall also be incorporated in the technical scope of the present invention.

It should be noted that the execution sequence of each processing such as operations, procedures, steps and phases in the apparatus, system program and method shown in the claims, specification, and drawings is not specifically clarified with such phrases as "prior to" and "before", and that unless an output of the prior processing is used in the subsequent processing, they can be executed in an arbitrary sequence. Even though the operation flows in the claims, specification and drawings are described by using such phrases as "first" and "next" for the sake of convenience, it does not mean that the operation flows should be executed in this order.

REFERENCE SIGNS LIST 10, 80 Imaging apparatus, 100, 1300 Lens system, 110, 1310 Lens, 115 Optical device, 120, 1320 Exit pupil, 122 Right pupil region, 123 Central pupil region, 124 Left pupil region, 130 Object light beam, 140 Deflection section, 142 Prism element, 150 Microlens section, 152 Microlens, 160 Light receiving section, 162 Light receiving element, 170 Image signal generation section, 180 Control section, 190 Image recording section, 200, 400 Housing, 210, 220, 230, 310, 320, 330 Fluid region, 240, 440, 540, 640, 940 Divider section, 242, 442 Divider plate, 250 Through hole, 252, 254, 552, 554, 642, 644, 942, 944 Lateral surface portion, 260 Color filter, 262 Light-shielding section, 281, 282, 581, 582, 981, 982, 680 Prism element, 290, 291, 292, 490 Driving section, 298 Expansion and contraction direction, 280 Elastic surface, 350 Row direction, 360 Column direction, 410 Right view image, 412, 422, 432, 452 Short-distance object image, 414, 424, 434, 454 Long-distance object image, 420 Left view image, 430, 450 Center view image, 700, 701, 702, 703, 704 Protruding portion, 822 Pupil region, 1000 Image surface, 1110 Short focus image, 1120 Middle focus image, 1130 Long focus image, 1112, 1122, 1132, 1152 Short-distance object image, 1114, 1124, 1134, 1154 Middle-distance object image, 1116, 1126, 1136, 1156 Long-distance object image, 1150 Synthesized image, 1322 Partial pupil region

The invention claimed is:

1. An imaging device for an imaging apparatus adapted to image an object through an image formation lens, comprising:

a light receiving section having a plurality of light receiving elements;

a microlens section having a plurality of microlenses respectively provided corresponding to a plurality of the light receiving elements to make the corresponding light receiving elements receive an object light beam that passed through the image formation lens;

a control section adapted to control shapes of the plurality of the microlenses so as to control pupil regions in an exit pupil of the image formation lens that pass a light beam that should be received by each of the plurality of the light receiving elements; and an image signal generation section adapted to generate an image signal of an image of the object based on imaging signals of the plurality of the light receiving elements, wherein the control section controls the shapes of the microlenses to be changed from a shape having first refractive power to a shape having second refractive power that is larger than the first refractive power so as to limit sizes of the pupil regions that pass the light beam that should be received by the plurality of the light receiving elements, and the imaging device further comprising a deflection section having a plurality of first deflection optical elements, the first deflection optical elements being provided respectively corresponding to a plurality of first light receiving elements, out of the plurality of the light receiving elements, to make the corresponding first light receiving elements receive, via the corresponding microlenses, an object light beam that passed through a first pupil region in the exit pupil when the plurality of the microlenses are controlled to be in the shape having the second refractive power.

2. The imaging device according to claim 1, wherein the deflection section further includes a plurality of second deflection optical elements, the second deflection optical elements being provided respectively corresponding to a plurality of second light receiving elements, out of the plurality of the light receiving elements, to make the corresponding second light receiving elements receive, via the corresponding microlenses, an object light beam that passed through a second pupil region in the exit pupil when the plurality of the microlenses are controlled to be in the shape having the second refractive power.

3. The imaging device according to claim 2, wherein the plurality of the first deflection optical elements and the plurality of the second deflection optical elements are each fluid prism elements that form a prism interface from an interface between a third fluid and a fourth fluid which are different in refractivity from each other, and
the control section switches between a first imaging mode and a second imaging mode, the first imaging mode being adapted for imaging by controlling the plurality of the microlenses to be in the shape having the first refractive power while controlling the prism interface to be vertical to an optical axis of the image formation lens, the second imaging mode being adapted for imaging by controlling the plurality of the microlenses to be in the shape having the second refractive power while controlling the prism interface to be inclined with respect to the optical axis of the image formation lens.

4. The imaging device according to claim 3, wherein in the case of taking images of different viewpoints, the control section controls the imaging mode to be the second imaging mode, and
the image signal generation section generates image signals of the images of the different viewpoints based on imaging signals of the plurality of the first light receiving elements and imaging signals of the plurality of the second light receiving elements.

5. The imaging device according to claim 4, wherein the image formation lens is a lens having focal lengths different in every region, so that an object light beam that passed through a region of the image formation lens having a first focal length passes through the first pupil region, while an object light beam that passed through a region of the image formation lens having a second focal length passes through the second pupil region,
in the case of imaging an object with different focal lengths, the control section controls the imaging mode to be the second imaging mode, and
the image signal generation section generates image signals of an image with the first focal length and an image with the second focal length based on imaging signals of the plurality of the first light receiving elements and imaging signals of the plurality of the second light receiving elements.

6. The imaging device according to claim 1, wherein the plurality of the microlenses are each fluid microlenses formed from an interface between a first fluid and a second fluid which are different in refractivity from each other, and
the control section controls the shapes of the plurality of the microlenses by controlling shapes of the interface.

7. The imaging device according to claim 2, wherein the plurality of the microlenses are each fluid microlenses formed from an interface between a first fluid and a second fluid which are different in refractivity from each other, and
the control section controls the shapes of the plurality of the microlenses by controlling shapes of the interface.

8. The imaging device according to claim 3, wherein the plurality of the microlenses are each fluid microlenses formed from an interface between a first fluid and a second fluid which are different in refractivity from each other, and
the control section controls the shapes of the plurality of the microlenses by controlling shapes of the interface.

9. The imaging device according to claim 4, wherein the plurality of the microlenses are each fluid microlenses formed from an interface between a first fluid and a second fluid which are different in refractivity from each other, and
the control section controls the shapes of the plurality of the microlenses by controlling shapes of the interface.

10. The imaging device according to claim 5, wherein the plurality of the microlenses are each fluid microlenses formed from an interface between a first fluid and a second fluid which are different in refractivity from each other, and
the control section controls the shapes of the plurality of the microlenses by controlling shapes of the interface.

11. The imaging device according to claim 6, wherein the microlens section has:
a lens housing adapted to hold therein the first fluid and the second fluid; and
a divider plate adapted to divide an inside of the lens housing into a first fluid region filled with the first fluid and a second fluid region filled with the second fluid, wherein
the divider plate has a plurality of through holes formed corresponding to the plurality of the light receiving elements,
the plurality of the microlenses are formed from an interface between the first fluid and the second fluid in each of the plurality of the through holes, and
the control section controls the shapes of the microlenses by controlling internal pressure of the first fluid region.

12. The imaging device according to claim 7, wherein the microlens section has:
a lens housing adapted to hold therein the first fluid and the second fluid; and
a divider plate adapted to divide an inside of the lens housing into a first fluid region filled with the first fluid and a second fluid region filled with the second fluid, wherein
the divider plate has a plurality of through holes formed corresponding to the plurality of the light receiving elements,
the plurality of the microlenses are formed from an interface between the first fluid and the second fluid in each of the plurality of the through holes, and
the control section controls the shapes of the microlenses by controlling internal pressure of the first fluid region.

13. The imaging device according to claim 8, wherein the microlens section has:
a lens housing adapted to hold therein the first fluid and the second fluid; and
a divider plate adapted to divide an inside of the lens housing into a first fluid region filled with the first fluid and a second fluid region filled with the second fluid, wherein the divider plate has a plurality of through holes formed corresponding to the plurality of the light receiving elements, the plurality of the microlenses are formed from an interface between the first fluid and the second fluid in each of the plurality of the through holes, and the control section controls the shapes of the microlenses by controlling internal pressure of the first fluid region.

14. The imaging device according to claim 9, wherein the microlens section has:

a lens housing adapted to hold therein the first fluid and the second fluid; and a divider plate adapted to divide an inside of the lens housing into a first fluid region filled with the first fluid and a second fluid region filled with the second fluid, wherein the divider plate has a plurality of through holes formed corresponding to the plurality of the light receiving elements, the plurality of the microlenses are formed from an interface between the first fluid and the second fluid in each of the plurality of the through holes, and the control section controls the shapes of the microlenses by controlling internal pressure of the first fluid region.

15. The imaging device according to claim 10, wherein the microlens section has:

a lens housing adapted to hold therein the first fluid and the second fluid; and a divider plate adapted to divide an inside of the lens housing into a first fluid region filled with the first fluid and a second fluid region filled with the second fluid, wherein the divider plate has a plurality of through holes formed corresponding to the plurality of the light receiving elements, the plurality of the microlenses are formed from an interface between the first fluid and the second fluid in each of the plurality of the through holes, and the control section controls the shapes of the microlenses by controlling internal pressure of the first fluid region.

16. The imaging device according to claim 3, wherein the deflection section has:

a prism housing adapted to hold the third fluid and the fourth fluid; and a divider plate adapted to divide an inside of the prism housing, along the optical axis, into a third fluid region filled with the third fluid and a fourth fluid region filled with the fourth fluid, wherein the divider plate has a plurality of through holes formed corresponding to positions at which a plurality of the fluid prism elements are formed, and the control section controls an inclination of the prism interface with respect to the optical axis by controlling, with internal pressure of the third fluid region, a position of the prism interface in a first lateral portion of the plurality of the through holes and a position of the prism interface in a second lateral portion that is opposed to the first lateral portion.

17. The imaging device according to claim 4, wherein the deflection section has:

a prism housing adapted to hold the third fluid and the fourth fluid; and a divider plate adapted to divide an inside of the prism housing, along the optical axis, into a third fluid region filled with the third fluid and a fourth fluid region filled with the fourth fluid, wherein the divider plate has a plurality of through holes formed corresponding to positions at which a plurality of the fluid prism elements are formed, and the control section controls an inclination of the prism interface with respect to the optical axis by controlling, with internal pressure of the third fluid region, a position of the prism interface in a first lateral portion of the plurality of the through holes and a position of the prism interface in a second lateral portion that is opposed to the first lateral portion.

18. The imaging device according to claim 5, wherein the deflection section has:

a prism housing adapted to hold the third fluid and the fourth fluid; and a divider plate adapted to divide an inside of the prism housing, along the optical axis, into a third fluid region filled with the third fluid and a fourth fluid region filled with the fourth fluid, wherein the divider plate has a plurality of through holes formed corresponding to positions at which a plurality of the fluid prism elements are formed, and the control section controls an inclination of the prism interface with respect to the optical axis by controlling, with internal pressure of the third fluid region, a position of the prism interface in a first lateral portion of the plurality of the through holes and a position of the prism interface in a second lateral portion that is opposed to the first lateral portion.

19. The imaging device according to claim 8, wherein the deflection section has:

a prism housing adapted to hold the third fluid and the fourth fluid; and a divider plate adapted to divide an inside of the prism housing, along the optical axis, into a third fluid region filled with the third fluid and a fourth fluid region filled with the fourth fluid, wherein the divider plate has a plurality of through holes formed corresponding to positions at which a plurality of the fluid prism elements are formed, and the control section controls an inclination of the prism interface with respect to the optical axis by controlling, with internal pressure of the third fluid region, a position of the prism interface in a first lateral portion of the plurality of the through holes and a position of the prism interface in a second lateral portion that is opposed to the first lateral portion.

20. The imaging device according to claim 9, wherein the deflection section has:

a prism housing adapted to hold the third fluid and the fourth fluid; and a divider plate adapted to divide an inside of the prism housing, along the optical axis, into a third fluid region filled with the third fluid and a fourth fluid region filled with the fourth fluid, wherein the divider plate has a plurality of through holes formed corresponding to positions at which a plurality of the fluid prism elements are formed, and the control section controls an inclination of the prism interface with respect to the optical axis by controlling, with internal pressure of the third fluid region, a position of the prism interface in a first lateral portion of the plurality of the through holes and a position of the prism interface in a second lateral portion that is opposed to the first lateral portion.

* * * * *